(12) United States Patent
Poulad et al.

(10) Patent No.: US 11,512,952 B1
(45) Date of Patent: Nov. 29, 2022

(54) ENHANCED DETECTION OF SENSOR MISALIGNMENTS BY COORDINATING SENSORS UTILIZING MULTIPLE SENSING MODALITIES

(71) Applicant: MICROSOFT TECHNOLOGY LICENSING, LLC, Redmond, WA (US)

(72) Inventors: Navid Poulad, San Jose, CA (US); Rayna Demaster-Smith, Redmond, WA (US); Georg Klein, Bellevue, WA (US); Jeffrey Neil Margolis, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/364,783

(22) Filed: Jun. 30, 2021

(51) Int. Cl.
*G01B 21/24* (2006.01)
*G01D 21/02* (2006.01)
*G02B 27/01* (2006.01)

(52) U.S. Cl.
CPC ............. *G01B 21/24* (2013.01); *G01D 21/02* (2013.01); *G02B 27/0172* (2013.01); *G02B 27/0176* (2013.01); *G02B 2027/014* (2013.01); *G02B 2027/0132* (2013.01); *G02B 2027/0178* (2013.01)

(58) Field of Classification Search
USPC .......................................................... 345/8
See application file for complete search history.

(56) References Cited

U.S. PATENT DOCUMENTS

| 5,742,264 A * | 4/1998 | Inagaki ................. G09G 5/397 348/E5.145 |
| 2012/0235893 A1* | 9/2012 | Phillips .................. G06F 3/013 345/204 |

(Continued)

FOREIGN PATENT DOCUMENTS

WO 2020163662 A1 8/2020

OTHER PUBLICATIONS

"International Search Report and Written Opinion Issued in PCT Application No. PCT/US22/031682", dated Sep. 21, 2022, 15 Pages.

*Primary Examiner* — Chineyere D Wills-Burns
(74) *Attorney, Agent, or Firm* — Scott Y. Shigeta; Newport IP LLC

(57) ABSTRACT

The techniques disclosed herein detect sensor misalignments in a display device by the use of sensors operating under different modalities. In some configurations, a near-to-eye display device can include a number of sensors that can be used to track movement of the device relative to a surrounding environment. The device can utilize multiple sensors operating under multiple modalities. For each sensor, there is a set of intrinsic and extrinsic properties that are calibrated. The device is also configured to determine refined estimations of the intrinsic and extrinsic properties at runtime. The refined estimations of the intrinsic and extrinsic properties can then be used to derive knowledge on how the device has deformed over time. The device can then use the refined estimations of the intrinsic and extrinsic properties and/or any other resulting data that quantifies any deformations of the device to make adjustments to rendered images at runtime.

20 Claims, 12 Drawing Sheets

(56) References Cited

U.S. PATENT DOCUMENTS

| | | | |
|---|---|---|---|
| 2013/0120224 A1* | 5/2013 | Cajigas | G06F 3/012 345/8 |
| 2013/0310956 A1* | 11/2013 | Rehkemper | A63F 13/25 700/83 |
| 2015/0316767 A1 | 11/2015 | Ebstyne et al. | |
| 2016/0131913 A1* | 5/2016 | Kim | G02C 5/20 359/630 |
| 2017/0186199 A1* | 6/2017 | Yeung | G06T 11/60 |
| 2020/0107945 A1* | 4/2020 | Trousdale | A61B 5/1128 |
| 2020/0292646 A1* | 9/2020 | Spanoudaki | G01S 15/89 |
| 2021/0217147 A1* | 7/2021 | Edwin | H04N 13/327 |

* cited by examiner

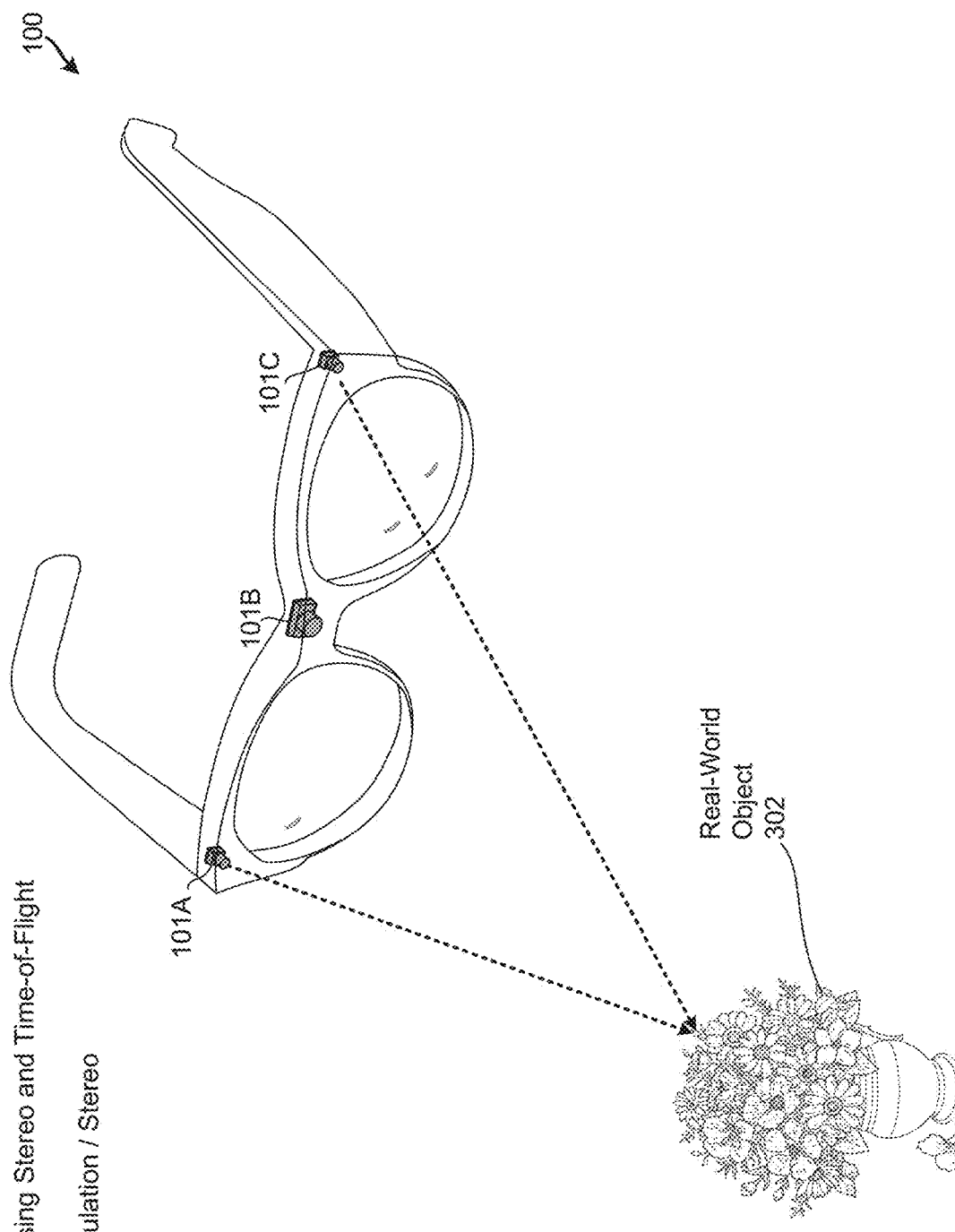

Embodiment:
  Multiple Modalities using Stereo and Time-of-Flight

Second Modality: Time-of-Flight

Embodiment:
    Three Camera, Multiple Modalities

First Modality using
    Triangulation / Stereo

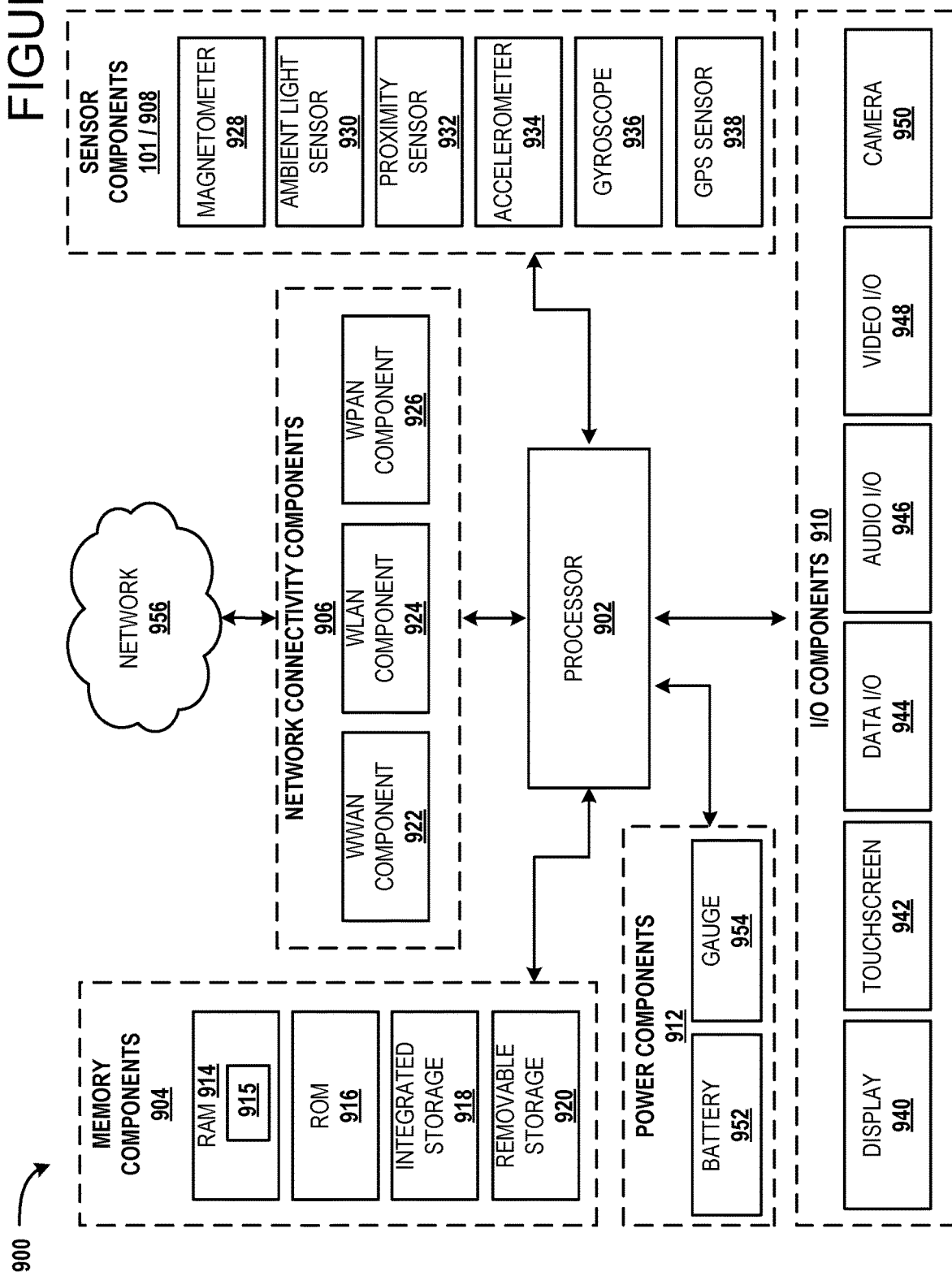

ENHANCED DETECTION OF SENSOR MISALIGNMENTS BY COORDINATING SENSORS UTILIZING MULTIPLE SENSING MODALITIES

BACKGROUND

Binocular alignment is a critical product requirement for any augmented reality (AR) product. Some systems address this issue by introducing display alignment sensors to enable the comparison of images displayed in the left and right displays to determine if corrections should be applied to any detected anomalies. However, as the AR industry transitions from Enterprise to Consumer, the binocular alignment problem will need to be solved in a form factor that more closely resembles traditional eyeglasses rather than a headset. That trend introduces new design challenges because having a form factor that is more similar to glasses can be incompatible with any existing alignment sensors. Furthermore, the new form factor itself introduces additional complexities that were not present in some existing designs. In some cases, a smaller form factor does not offer the same structural support as a headset.

For illustrative purposes, consider a scenario where a person puts on a pair of glasses that is slightly too small for their head, but not small enough to be uncomfortable to wear. In such scenarios, the user's head will exert an outward force on the arms of the glasses, which will then cause the frame of the glasses to flex. That type of deformation of the device can significantly degrade the user experience for a number of reasons. First, this type of deformation can impact the alignment of the head tracking sensors, leading to tracking errors which materialize as hologram jitter and unintended movement of a rendered hologram. In addition, among other issues, this type of flexure can impact the binocular alignment of the displays, potentially leading to visual discomfort while in use. It is with respect to these technical issues and others that the present disclosure is made.

SUMMARY

The techniques disclosed herein detect and compensate for sensor misalignments in a display device by the use of sensors across multiple modalities. In some configurations, a near-to-eye display device can include a number of sensors that can be used to track movement of the device relative to a surrounding environment. The device can utilize multiple sensors having multiple modalities, which can involve the visible light, infrared light, inertial data, time-of-flight data, etc. For each sensor, there is a set of intrinsic and extrinsic properties that are calibrated at a time, $T_0$, which can be done during a calibration process, e.g., time of manufacturing, etc. The device is also configured to determine refined estimations of the intrinsic and extrinsic properties at runtime. The refined estimations of the intrinsic and extrinsic properties can then be used to derive knowledge on how the device has deformed over time. Deformations can be caused by a number of factors including, but not limited to, forces that are applied to the device, temperature changes, degradation or aging of one or more device components, etc. The device can then use the refined estimations of the intrinsic and extrinsic properties and/or any other resulting data that quantifies any deformations to make adjustments to rendered images at runtime.

In some configurations, the intrinsic and extrinsic properties of any sensor of a device can be derived relative to a common reference point. This can occur at $T_0$, e.g., in a factory. The device can also be configured to conduct field calibrations using live data to revise intrinsic and extrinsic estimates of the sensors during use. Among other features, for example, embodiments disclosed herein introduce a device that utilizes multiple modalities, e.g., sensors utilizing at least two sensing modalities. For example, one or more sensors can utilize visible light cameras to reference details and information and learn from how the data of a depth camera has contributed to the revised estimates. By comparing and using measurements from different sensing modalities, a device can more accurately track the movement of the device even if the device endures some form of deformation or structural alteration.

In some configurations, a device can be configured with a least three sensors that operate across multiple modalities. At least two sensors can be used to determine a first distance measurement to a real-world object in a surrounding environment using stereo or triangulation techniques, while a third sensor can determine a second distance measurement to the real-world object using direct or time-of-flight techniques. These two different modalities providing distance measurements from two different types of depth measurements that each have error, which can each manifest differently during operation. The techniques disclosed herein can use either measurement as a ground truth for the other. By using different modalities, which can involve measurements from stereo and time-of-flight or other combinations of other types of sensors, a device can provide data points that allow the device to correlate, constrain, and correct visual anomalies caused by a device deformation.

The techniques disclosed herein provide a number of technical benefits and technical effects. By identifying differences in the intrinsic and extrinsic properties that are determined at $T_0$ relative to estimations of the intrinsic and extrinsic properties at runtime, deformations in the device can be accurately tracked without requiring each sensor to have specific properties or be located in precise locations. This provides many benefits over existing systems in that traditional tracking techniques can require each sensor to be positioned at specific orientations and precise locations, which can complicate the manufacturing process. Such existing devices can also have a number of issues, or become inoperable, if they are deformed or if sensors are moved. The disclosed techniques can allow for more flexibility during the manufacturing process by allowing the device to calibrate and operate properly regardless of an original location and orientation of each sensor. A display device can also be operable even if it deforms over time. This can be accomplished based on the techniques that allow the system to use live input data during runtime determine updated estimates of the intrinsic and extrinsic properties and compare sets of estimates over time.

The disclosed techniques also allow the device to accurately track deformations in the device by using sensors utilizing multiple sensing modalities. By the use of the revised intrinsic and extrinsic estimates of the sensors, data modeling the intrinsic and extrinsic estimates of a device can also be calculated. These elements can collectively be used to more accurately generate data modeling the movement of a display device. This estimation of the device movement, which is also based on estimated deformations, can allow the device to control the display of rendered objects, e.g., holograms.

By providing more accurate measurement of the movement of a device, the disclosed techniques can greatly improve a user experience and ultimately improve the usability of a device. Some existing systems that produce jitter and unintended movement of a rendered hologram can cause user discomfort or prevent a user from using a device altogether. By using the revised intrinsic and extrinsic estimates from different types of sensors, the techniques disclosed herein can reduce the amount of binocular disparity that can cause discomfort. In addition, binocular disparity can be maintained below 5 milliradians (0.29°), which can be the threshold below which a product can be classified as visually comfortable. The techniques provided herein provide this level of performance for flexible devices, e.g., devices that do not meet rigidity requirements.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4A is a perspective view of a display device having tracking sensors that operating in a first modality.

FIG. 9 is a computer architecture diagram illustrating an illustrative computer hardware and software architecture for a computing system capable of implementing aspects of the techniques and technologies presented herein.

DETAILED DESCRIPTION

Figure 1:
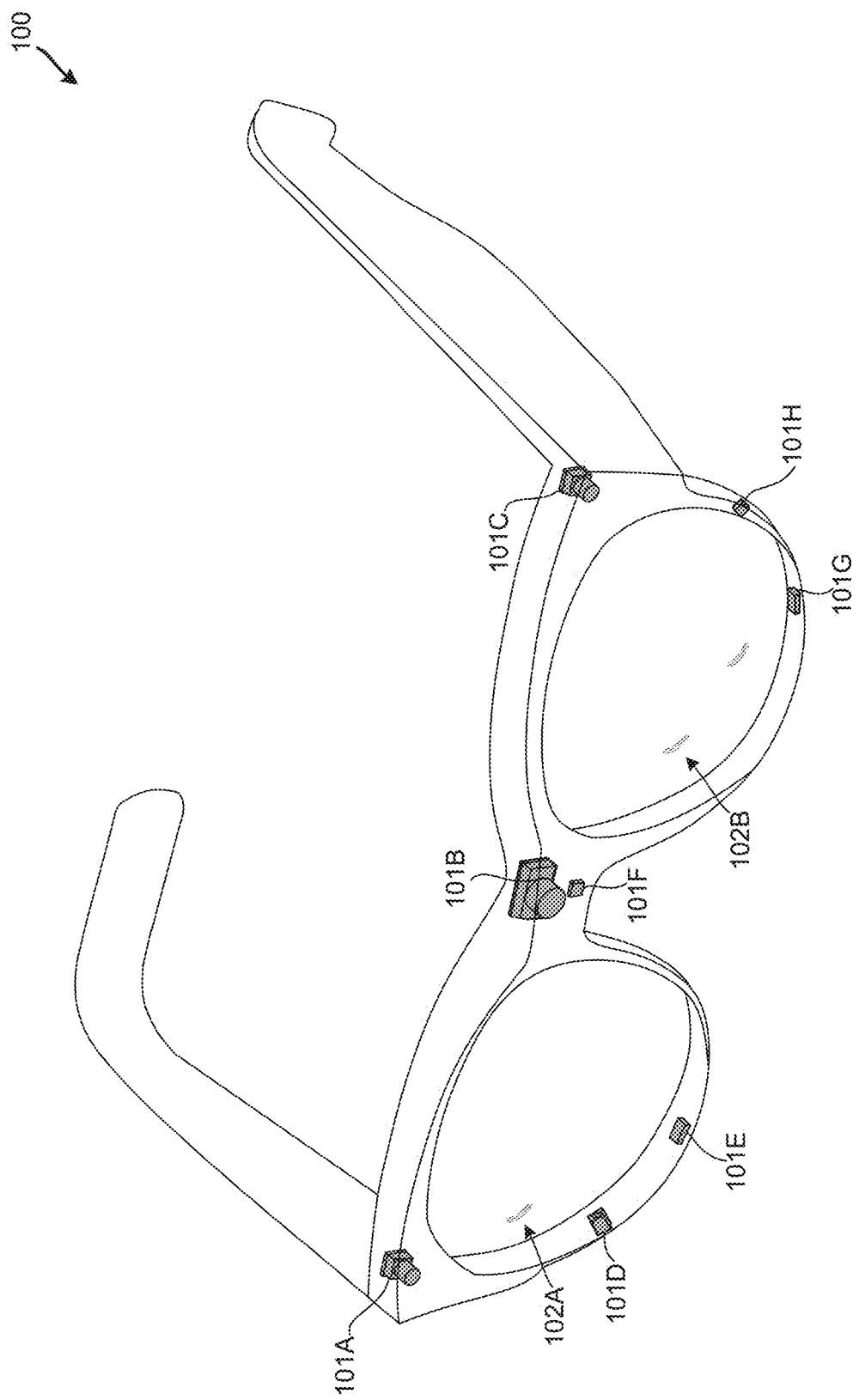
FIG. 1 is a perspective view of a display device having multiple tracking sensors that are across multiple modalities.

FIG. 1 shows a device 100 configured to detect sensor misalignments by the use of sensors across multiple modalities. In some configurations, the device 100 can be in the form of a near-to-eye display device that can include a number of sensors 101 used for tracking the movement of the device relative to a surrounding environment. The device can include semi-transparent lenses 102, e.g., a right lens 102A and a left lens 102B, that can enable a user to concurrently view real-world objects in a surrounding environment with rendered objects. The device can coordinate the movement of the sensors to provide an augmented reality experience, where positions of some rendered objects are controlled so they are superimposed over real-world objects. Sensors that are used to track the movement of the device can control the position of rendered objects such that the rendered objects can maintain a position with respect to specific real-world objects when the device rotates or moves within the surrounding environment.

The device can utilize multiple sensors across multiple modalities. For illustrative purposes, a sensing modality can include a particular sensing technique. Examples of sensing techniques can involve, for example, a stereo depth measurement in combination with time-of-flight depth measurement. In another example, which is described in more detail below, an individual sensing technique can involve the use of multiple IMUs, or the use of IMUs with a stereo depth measurement, etc. In one illustrative example, the device can include a set of sensors utilizing a first sensing modality, e.g., the first sensor 101A and the third sensor 101C configured to perform a first depth measurement based on a stereo measurement. The device can also include other sensors utilizing a second sensing modality, e.g., a second sensor 101B configured to perform a second depth measurement based on a time-of-flight measurement. This example is provided for illustrative purposes and is not to be construed as limiting. Can be appreciated that the device 100 can comprise any suitable number of sensors, e.g., sensors 101A-101H, and utilize any combination of sensing modalities. In some configurations, a suitable number of sensors can include at least three sensors that utilize at least two sensing modalities.

The device 100 can determine sets of intrinsic and extrinsic properties for each sensor during a calibration process and during runtime. A first set of properties can be generated using any suitable calibration method executed at a predetermined time, e.g., at $T_0$, which can be done at manufacturing, delivery, prior to use, etc. The device is also configured to determine refined estimations of the intrinsic and extrinsic properties at runtime. The refined estimations of the intrinsic and extrinsic properties can then be used to derive output data that indicates how the device has deformed over time. Deformations can be caused by a number of factors including, but not limited to, forces that are applied to the device, temperature changes, degradation or aging of one or more components, etc. The device can then use the refined estimations of the intrinsic and extrinsic properties and/or any other resulting output data that quantifies any deformations to make adjustments to rendered images at runtime. The adjustments to the rendered object can be based on the refined estimations to compensate for any visual misalignments that may be caused by a deformation of the device.

In general, the sensor properties are parameters that define the relationship between the 3D coordinates of a point in a physical environment surrounding the device from which the light or other forms of measurable signals or movement (IR, magnetic field, laser, inertia) come from and the 2D coordinates of an image plane. The intrinsic properties, also referred to herein as internal parameters, are the parameters intrinsic to a sensor itself. The intrinsic properties can include, but are not limited to, a focal length, field-of-view, and lens distortion. The intrinsic properties can also include an optical center, also known as the principal point, and a skew coefficient. The extrinsic parameters, also referred to herein as external parameters or sensor pose, are the parameters used to describe the transformation between the sensor and a surrounding environment. For example, extrinsic parameters can include, but are not limited to, the relative rotation and translation between sensors, which can be used in applications such as depth estimation and structure deformations. Sensor pose includes a combination of a position and orientation of a sensor. Properties for the device can also be derived from the sensor properties. For instance, extrinsic parameters for the device 100 are the parameters used to describe the transformation between the device 100 and the surrounding environment, or movement relative to a real-world object in the surrounding environment.

Figure 2:
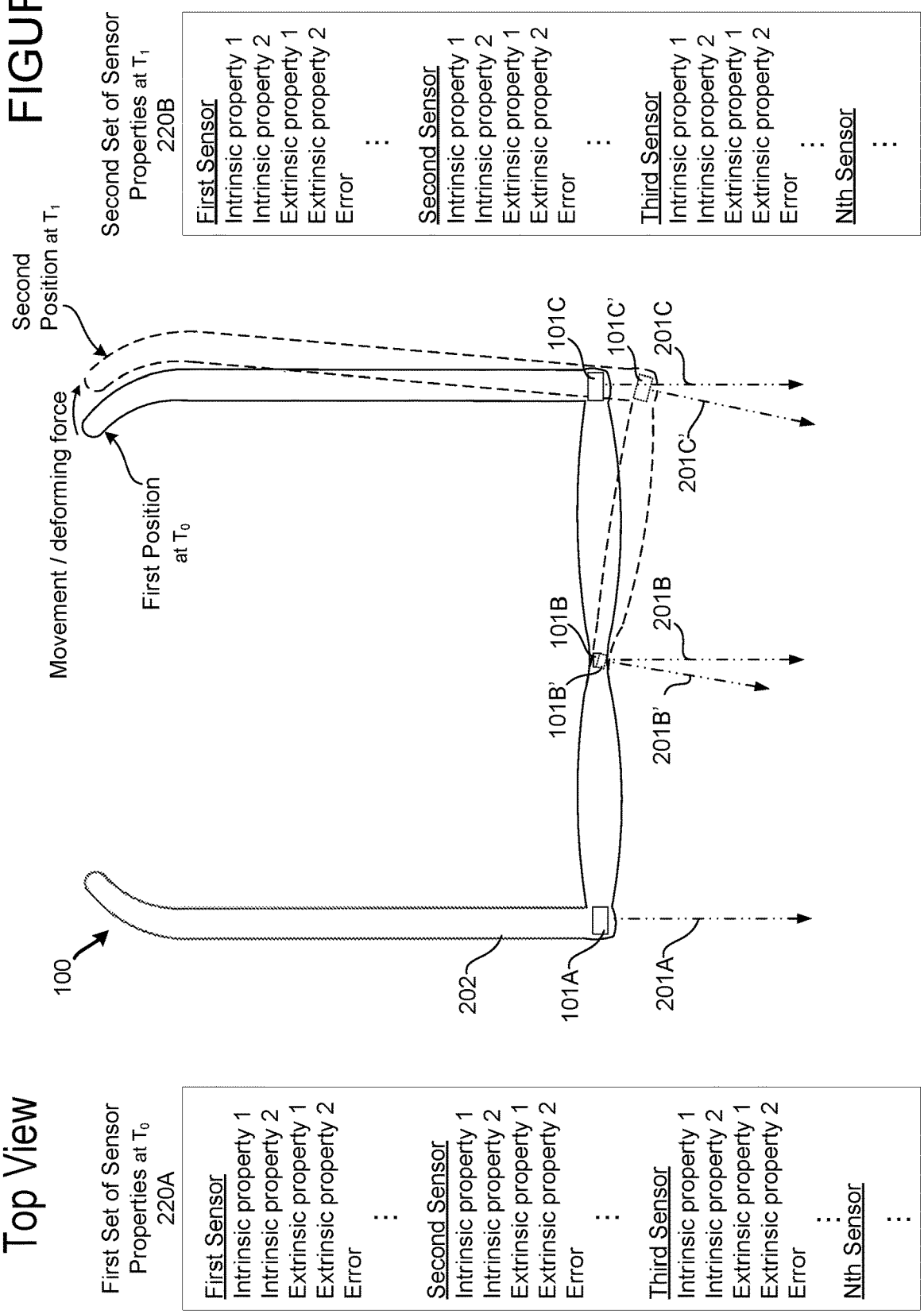
FIG. 2 is a top view of a display device having multiple tracking sensors that are across multiple modalities.

Any of sensor properties and device properties can change over time due to deformations of the device, aging of the device or a sensor, and/or temperature changes of the device 100 or one or more sensors 101. To address such issues, the device 100 can determine revised estimates of the properties over time and compare those against prior estimates of the properties. For instance, FIG. 2 shows an example how some of the sensors 101 of a device 100 can move with respect to one another when the device 100 endures some form of structural deformation, which may occur when a user positions the device 100 over their head. Such a structural deformation can cause the estimates of the properties to change over time. By comparing estimates determined at different times, e.g., a set determined at calibration and a set determined by live data during runtime, the device can control one or more aspects of a rendered object to compensate for visual anomalies, e.g., misalignment or inadvertent movements, of the structural deformation.

In the example of FIG. 2, the right side of the frame of the device can start at a first position and move to a second position. While at the first position, e.g., prior to operation by a user, the device can run a suitable calibration process to determine intrinsic and extrinsic properties of each sensor. This can include any combination of intrinsic and extrinsic properties, including but not limited to the properties described herein. Some of the properties are represented herein as reference vectors 201, which of which are provided to show an orientation and location of an individual sensor. For illustrative purposes, the reference vectors also indicate a direction of a viewing area or sensing area. For instance, at time $T_0$, properties of a first sensor 101A are represented by the first reference vector 201A, properties of a second sensor 102B are represented by the second reference vector 201B; and properties of a third sensor 101C are represented by the third reference vector 201C. The device can generate sensor properties 220 which can include location and orientation data for each sensor, e.g., extrinsic property 1, extrinsic property 2, etc. This example is provided for illustrative purposes and is not to be construed as limiting. This example illustrates how properties of a sensor may be influenced by a deformation of a device, and how a change in an orientation or position of one or more sensors can influence properties of each sensor. Specifically, the extrinsic properties of the first set of sensor properties 220A can be determined at $T_0$, and the extrinsic properties of the second set of sensor properties 220B can be determined at $T_1$.

In some configurations, a display device 100 can include at least three sensors 101 affixed to a frame 202 of the display device 100, wherein individual sets of sensors 101 operate under at least two sensing modalities. At a first time, e.g., $T_0$, the device can execute one or more suitable calibration methods by receiving signals from the three sensors to generate a first set of properties 220A for each of the three sensors operating with at least two different modalities. The first set of properties can include any combination of intrinsic or extrinsic properties, e.g., focal length, field-of-view, data defining a relative rotation and/or translation of a sensor, or relative rotation and/or translation of a sensor relative to other sensors. The first set of properties can also define error that is either known or measured for a particular sensor.

Once the calibration data set is determined, the device can determine estimates of the properties during runtime and compare those estimates with the properties determined at calibration. During runtime, a processor can receive additional signals during operation of the display device from the at least three sensors 101 to generate a second set of properties 220B for each of the at least three sensors. The device can determine if the first set of properties 220A and the second set of properties 220B meet one or more criteria. The device can then control a display of a rendered object 301 in response to determining that the first set of properties 220A and the second set of properties 220B meet one or more criteria, wherein the control of the display of the rendered object 301 maintains an alignment between the rendered object 301 and real-world objects in a surrounding environment even if the frame 202 of the display device 100 is subjected to a deformation.

By analyzing the properties determined at different times, e.g., during calibration and during runtime, the device can control the display of the rendered object 301 to compensate for misalignments between the rendered object 301 and a real-world object. Such embodiments can provide improvements over some existing systems, in which a deformation in a device, such as the deformation shown in FIG. 2, can cause the rendered object to inadvertently move even if the device has not moved relative to a surrounding environment. Such inadvertent movements, e.g., if the rendered object inadvertently moves relative to the real-world object beyond a predetermined threshold, can cause user discomfort.

Figure 3:
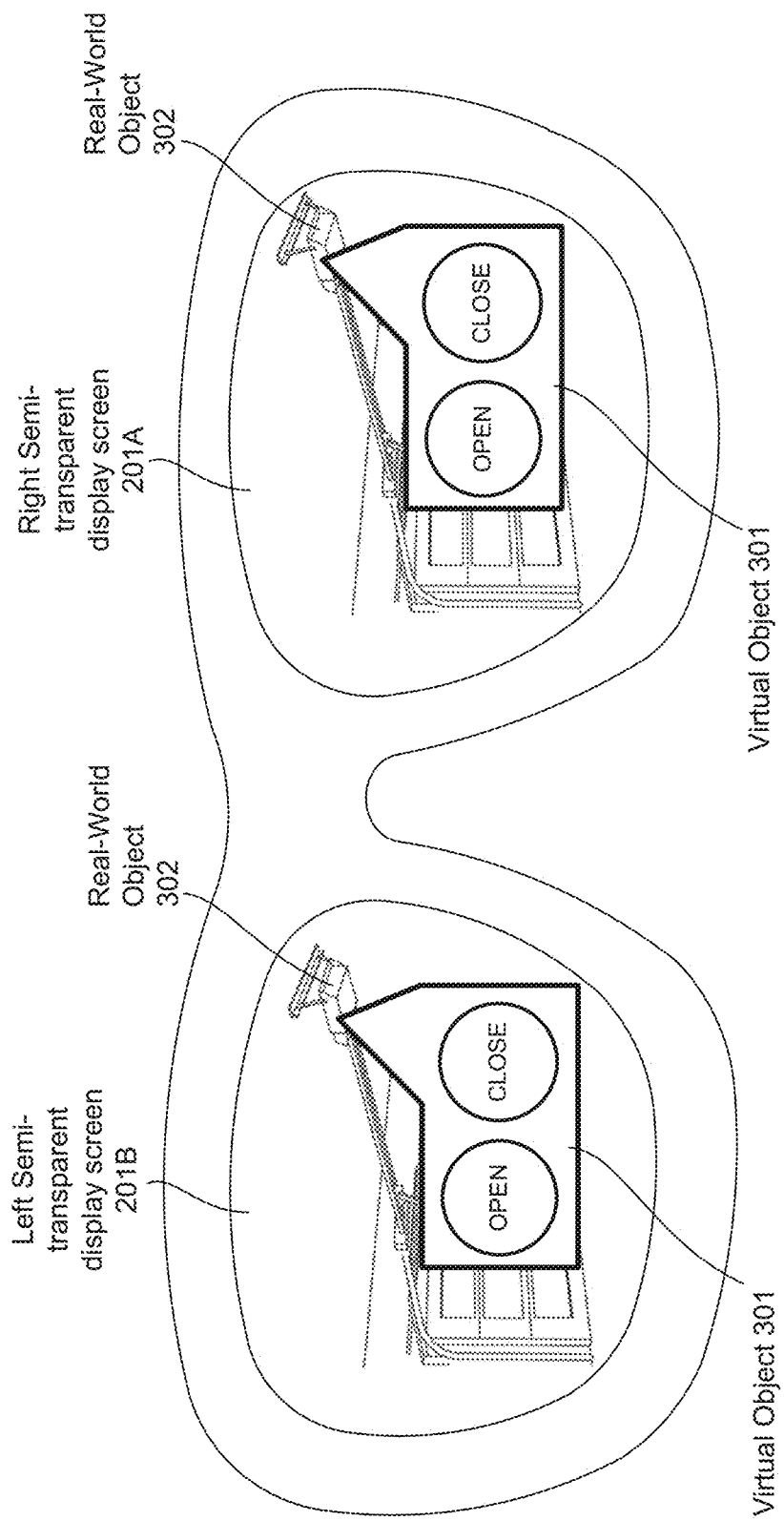
FIG. 3 shows a user's perspective of a display device having semi-transparent lenses that allow the user to view real-world objects and virtual objects.

In some embodiments, the device can control a display of a rendered object 301 in response to determining that the first set of properties 220A and the second set of properties 220B meet one or more criteria, wherein the control of the display of the rendered object 301 compensates for visual anomalies caused by a deformation of the frame 202 of the device. Visual anomalies can include, but are not limited to, unwanted movement of the rendered object within a display screen, jitter, or movement of the rendered object that is not consistent with the movement of the device. Without the use of the techniques disclosed herein, a deformation of the device may cause the sensors to generate signals that inaccurately indicate movement or rotation of the device when the device is not moving or not rotating. Visual anomalies can also include a delayed rotation or delayed movement of the rendered object that lags the actual rotation or movement of the device, which can lead to a visual disparity that exceeds a predetermined threshold, e.g., 5 milliradians. For example, in the example of FIG. 3, if the rendering of the virtual object 301 lags the actual movement of the real-world object 302 while a user rotates their head and the device, the device can cause a visual disparity in which the virtual object 301 may not maintain an effective graphical relationship with the real-world object 302, which can detract from an augmented reality experience. The use of properties 220 that are determined at different times can enable the device to maintain that graphical relationship even if the device is subject to some type of deformation. Visual anomalies can also include a misalignment between a rendered object and a real-world object, which may be caused by a position or orientation of a sensor being moved relative to other sensors when a device is deformed.

Figure 4B:
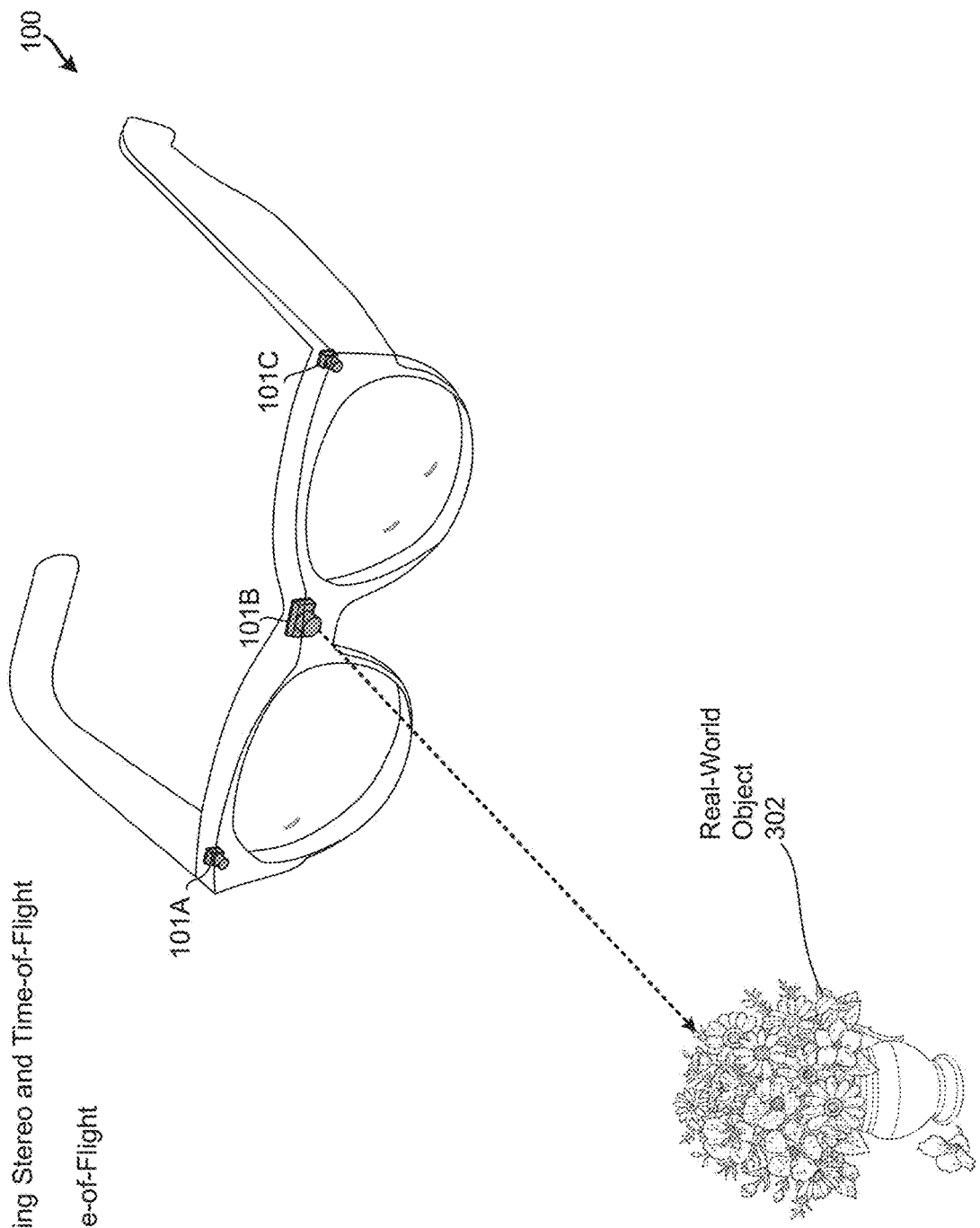
FIG. 4B is a perspective view of the display device of FIG. 4A having at least one sensor operating in a second modality.

Referring now to FIGS. 4A and 4B, an example of a device utilizing two different modalities is shown and described below. In this example, as shown in FIG. 4A, a first modality includes the use of two sensors to triangulate a location of an object. In some embodiments a first modality may include the use of any suitable stereo imaging techniques for determining a distance between the device and a real-world object. As shown in FIG. 4B, a second modality includes at least one other sensor to determine a distance using a direct measurement, e.g., time-of-flight. At various points in time, e.g., at manufacturing and runtime, the device can use the two sensors to determine a first measurement to a real-world object based on suitable triangulation methods or stereo-based methods. The system can concurrently determine a second measurement to the same real-world object using one or more direct methods, e.g., time-of-flight. These two different modalities provide data points that allow the device to correlate or constrain the aforementioned problems because the modalities can both include error, and the system can use either one of them as a ground truth for the other. If the first measurement and the second measurement meet one or more criteria, the device can control the display of a rendered object to maintain an alignment between the rendered object 301 and a surrounding environment even if the frame 202 of the display device 100 is subjected to a deformation.

The present disclosure also provides embodiments where a device includes a centrally-located camera. A centrally located camera can serve as the reference point for other sensors. During calibration, the spatial relationship between that camera ("$Cam_{ref}$") and other sensors is established and stored, which can be in nonvolatile memory. From that point on, if the alignment of the head tracking sensors, e.g., the first sensor 101A and third sensor 101C, is perturbed by external forces, any suitable software-based analysis can detect a change relative to the $Cam_{ref}$ and apply the necessary corrections to stabilize or coordinate the display of any rendered objects, e.g., holograms of an augmented reality environment.

Figure 5A:
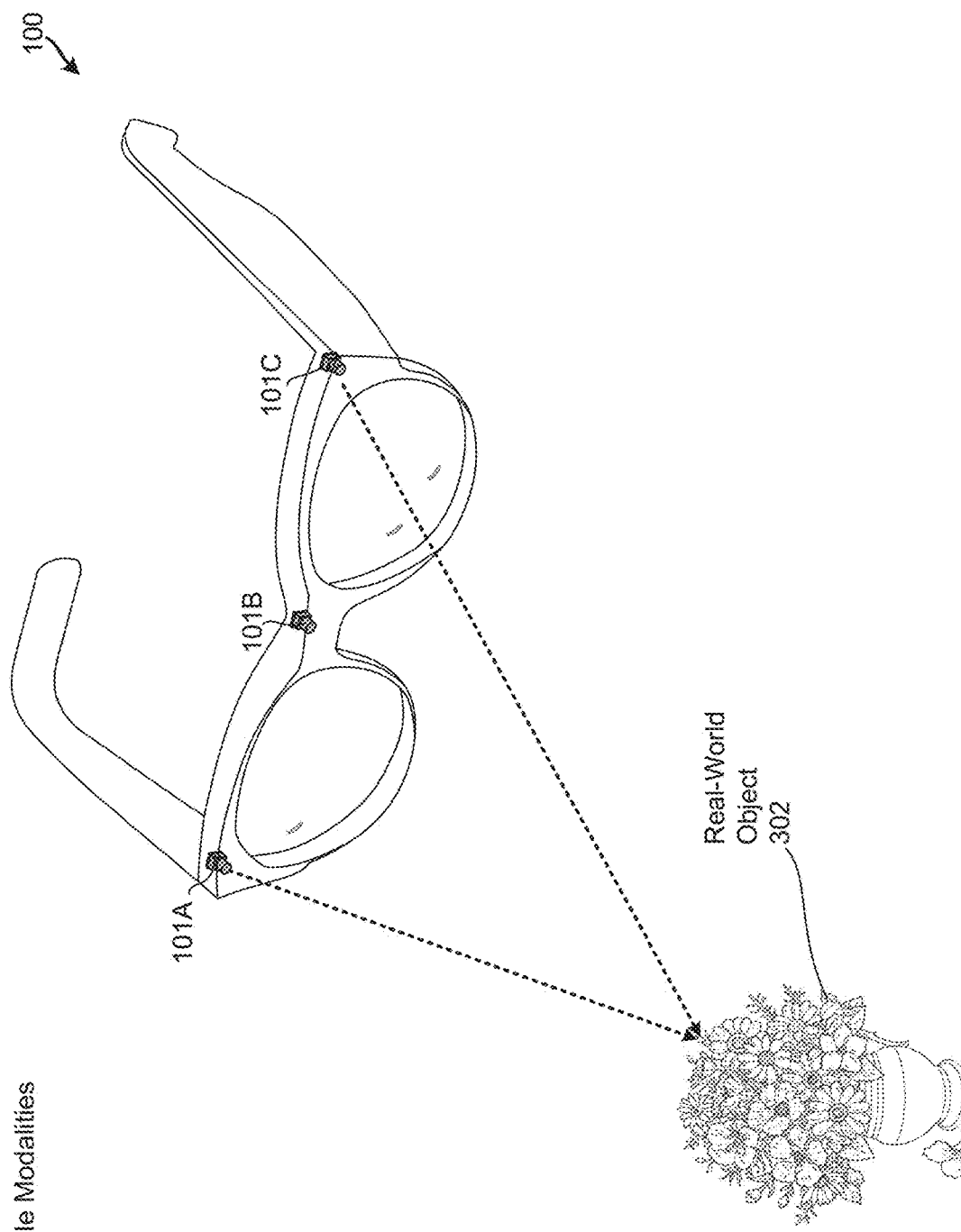
FIG. 5A shows an embodiment utilizing a first modality of multiple sensing modalities with a centrally located camera and two outer cameras.
Figure 5B:
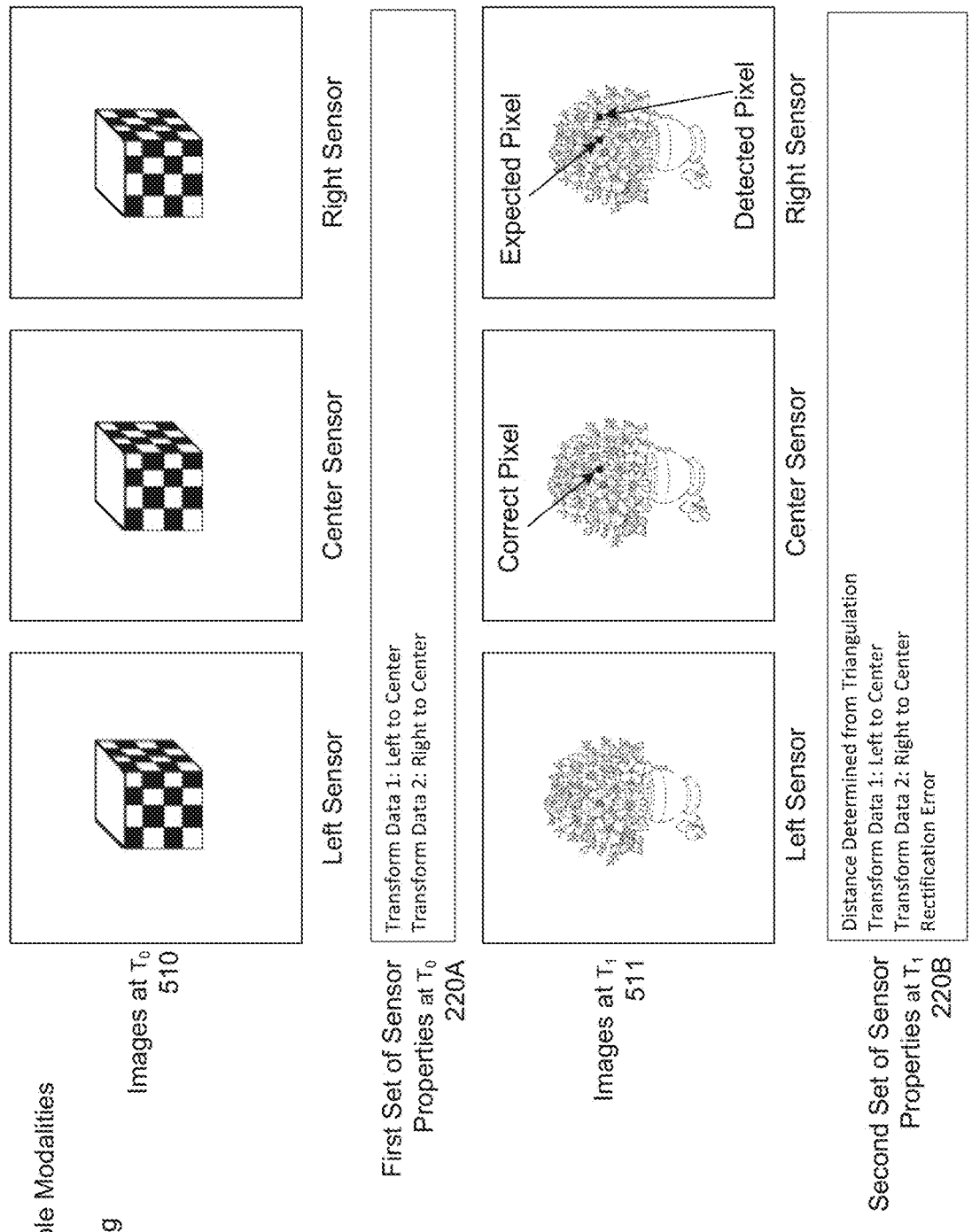
FIG. 5B shows an embodiment utilizing a second modality of multiple sensing modalities with a centrally located camera and two outer cameras.

Referring now to FIGS. 5A-5B, an embodiment of a device utilizing multiple sensing modalities with a centrally located camera is shown and described below. In this example, the device includes three imaging sensors with one sensor, e.g., the second sensor 101B, positioned between two other sensors, e.g., the first sensor 101A and the third sensor 101C. In some configurations, the second sensor 101B can be positioned at a center point between the first sensor 101A and the third sensor 101C. All three sensors can be positioned on the same horizontal plane. As described in more detail below, this example shows how a device can have multiple sensors that include the same sensor type but utilize at least two sensing modalities. This design can provide efficient techniques for detecting device deformation because, in some systems, it can be expected that the middle portion of the device is to have minimal deformation and the outside corners could be more susceptible to deformation, e.g., toe-in or toe-out deformation of a frame. Thus, a system can rely on a certain level of stability of the center sensor.

Generally described, one illustrative example of the device comprises three cameras that utilize two sensing modalities: (1) a stereo depth triangulation using the two outside sensors and (2) an image analysis of the images captured from the three cameras for determining a rectification error. This embodiment uses the measurement from the stereo depth triangulation and an analysis of images to determine a rectification error, which is used to determine if a device is deformed and to correct a display of a rendered object.

As shown in FIG. 5A, a method can include operations for performing a stereo depth triangulation using the two outside sensors, e.g., the first sensor 101A and the third sensor 101C. Although there is a depth measurement, this single measurement may be incorrect at times. To address this issue, as shown in FIG. 5B, the device is configured to compare images from each camera in the image plane to determine if the images indicate property differences that exceed a predetermined threshold. If the images indicate differences that exceed a predetermined threshold, the device replaces the original depth measurement determined from the stereo depth triangulation with a new depth measurement determined from the image analysis and a resulting rectification error.

The device can generate a first set of sensor properties 220A at $T_0$ by performing a calibration for each of the sensors to correlate their image planes. This process can rectify their image planes, e.g., generate a first set of sensor properties that indicates how the right sensor needs to transform to get the image of the center sensor, and how the left sensor needs to transform to get the image of the center sensor. The device then uses this first set of sensor properties 220A while operating in the field.

In the field, e.g., at $T_1$, the device can generate a second set of sensor properties 220B by processing images of each camera to correlate their image planes. This process can rectify their image planes, e.g., generate a second set of sensor properties that indicates how the right sensor needs to transform to get the image of the center sensor, and how the left sensor needs to transform to get the image of the center sensor. As a result of the processing at $T_0$ and $T_1$, the first set of data 220A defines a first set of transforms and the second set of data 220B defines a second set of transforms.

If the device detects a difference between the right-side sensor and the center sensor, the device can determine a value for an image rectification error and thus determine that the device has deformed on the right side. Once the rectification error is determined, e.g., a change in the transformation is detected, then the device can use that data to determine that there is an error with the right camera versus the center camera and not with the left camera. In other words, if the first set of transforms and the second set of transforms have a threshold difference, that difference is used to determine a rectification error, which can be used to also generate a depth error. Using the rectification error, the device can determine that the right camera has moved with respect to the center camera. For instance, a rectification error can indicate that the right camera is tilted down or tilted up with respect to the center camera. The device can also use the rectification error to update a position and/or an orientation of a rendered object to accommodate the detected deformation.

Similarly, if the device detects a difference between the left side sensor and the center sensor, the device can determine a value for an image rectification error and thus determine that the device has deformed on the left side. Once the rectification error is determined, e.g., a change in the transformation is detected, then the device can use that data to determine that there is an error with the left camera versus the center camera and not with the right camera. Using the rectification error, the device can determine that the left camera has moved with respect to the center camera. For instance, a rectification error can indicate that the left camera is tilted down or tilted up with respect to the center camera. The device can also use the rectification error to update a position and/or an orientation of a rendered object to accommodate the detected deformation. If the device detects a rectification error in both the left sensor and the right sensor, the device can use that information to determine that the deformation is horizontal.

As described in more detail below, once the device has determined the rectification or transform differential from the right-side camera and the left-side camera based on the center sensor, the device can determine that the deformation is toe-in or toe-out by a determined value and correct the depth scale measurement from the triangulation measurement using that determined value. The determined value is also used to re-render a hologram at a new position to correct any visual anomalies that can be caused by a deformation of the device.

In one illustrative example of a method, in a first modality, the device can first use triangulation with the outside sensors to determine a first measurement. Then, in a second modality, the device can use the transforms from the right and left side images with respect to an image of the center image. At calibration, at $T_0$, all three cameras are used to take individual images, as shown in the upper right corner of FIG. 5B. Based on this calibration at $T_0$, the device can use the initial transform data as a baseline of how the left image and the right image rectify with respect to each other on the image planes. Then, at runtime, e.g., $T_1$, as shown in the lower right corner of FIG. 5B, the device captures an image from each of the three cameras. Using these images, the device generates new transform data, e.g., the second set of properties, defining how the left image and the right image rectify with respect to each other on the image planes. Thus, at runtime, when the device takes an image with all three cameras and one of them has changed its orientation with respect to another camera, e.g., the device is deformed, the device will produce a rectification error from what is expected from the initial transform data. In some embodiments, if the initial transform data 220A shows a threshold change from the runtime transform data 220B, the system can use that difference to determine a value for a rectification error.

For example, from a point in space, the device can register on a certain horizontal pixel which is different for each sensor. Then, for example, when the right-side sensor translates inward due to a deformation of the device, that point in space is going to show up on a different pixel at $T_1$, e.g., a "detected pixel." In this example, it is going to show up on a pixel that is further to the outside of the sensor than where it would be expected, e.g., the "expected pixel," which derived from the image generated from the center camera. So, by comparing that right side image with the image from the center sensor, which still has that point in space placed in the correct pixel, the device can determine that the right-side sensor has translated inward.

Since the size of a pixel can be a given value, the device can determine how much the sensor has translated or rotated inward based on that given value. Also, given the pixel size, the device can determine that the sensor has translated inward by X amount, which can be used to determine a depth error. That depth error is then used to correct the first measurement that is based on the triangulation, e.g., using the first modality. The rendering of the image is then adjusted according to the corrected depth. As a result, the device can render a hologram at the right depth, thereby improving the user experience while in an augmented reality environment. In some embodiments, the device uses the original depth measurement from the stereo-based modality as a baseline and the device adjusts the baseline based on the error estimation from the image rectification error between the outside cameras and the center camera. Thus, differences between the first set of transforms and the second set of transforms can be used to determine a rectification error, which indicates that at least one camera has changed its orientation between $T_0$ and $T_1$. In some embodiments, the device uses the original depth measurement from the stereo-based modality as a baseline and if that baseline differs from a depth measurement, e.g., the error estimation, from the image rectification process by a threshold distance, the device can replace error between the outside cameras and the center camera.

Figure 6A:
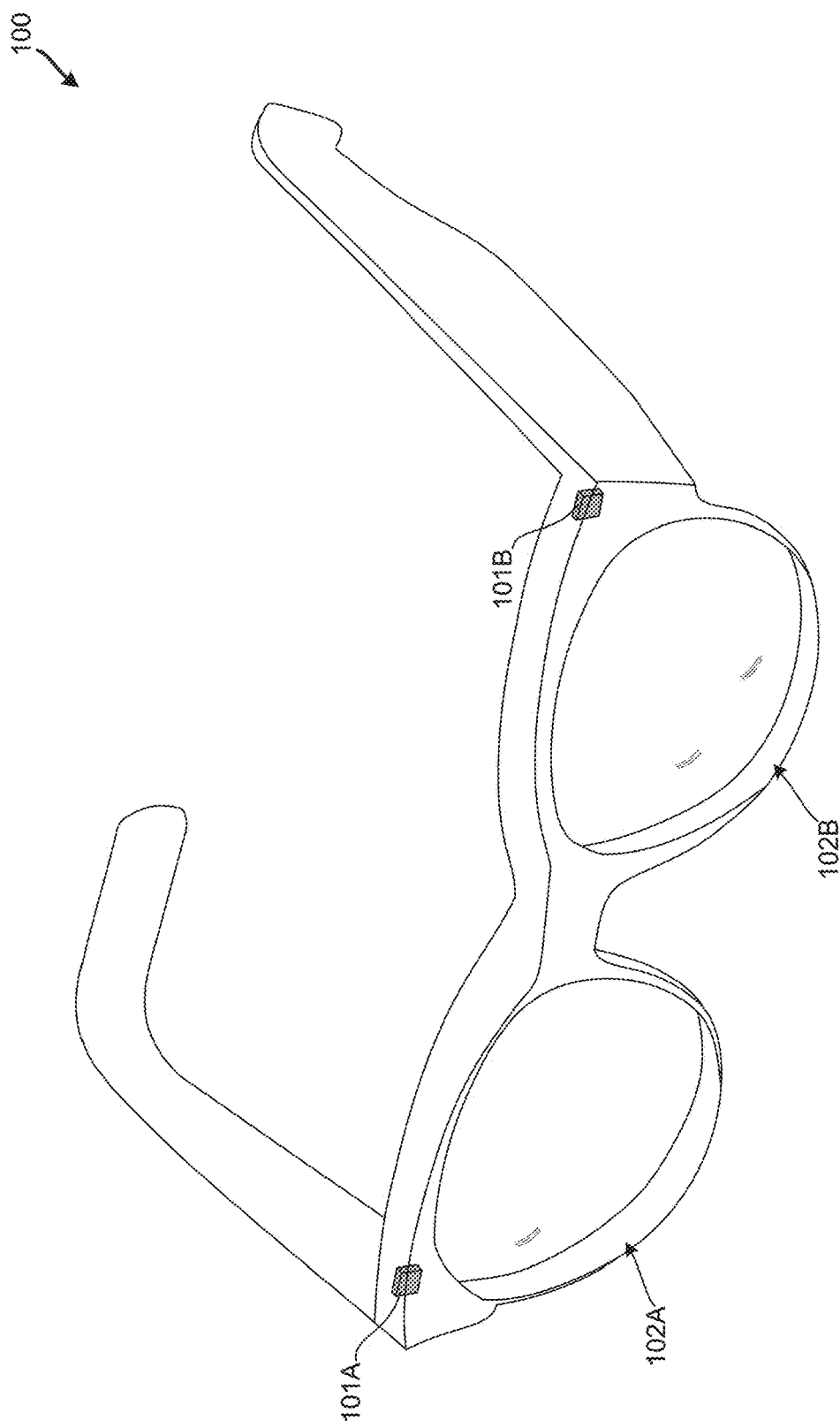
FIG. 6A shows embodiment utilizing a multi-IMU arrangement.
Figure 6B:
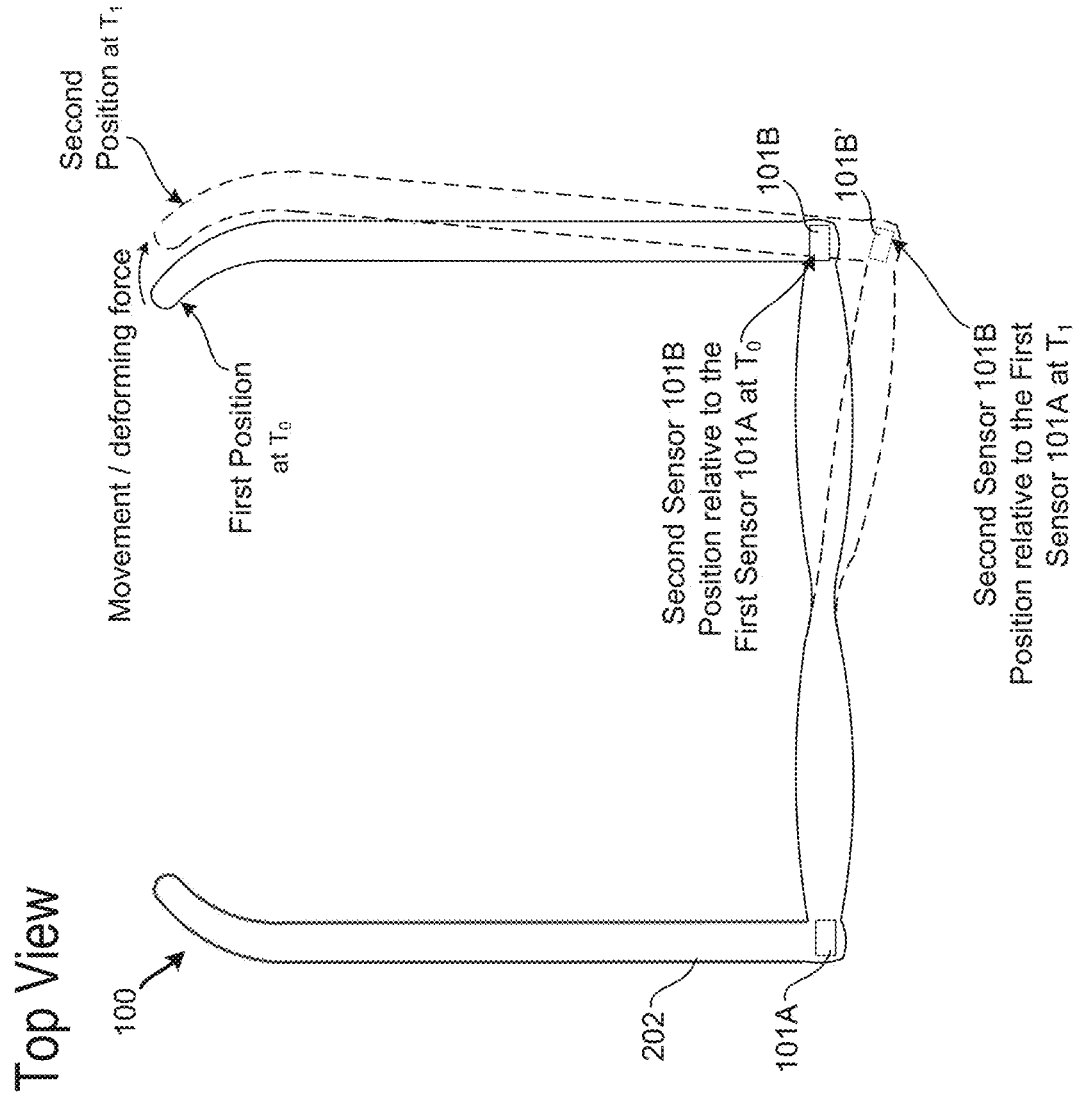
FIG. 6B is a top view of a display device having multiple IMUs for correcting image misalignments caused by a deformation.

The present disclosure also provides configurations where a device can include inertial measurement units ("IMUs") on both sides of the device. To illustrate such configurations, FIGS. 6A-6B show an embodiment for providing enhanced detection of sensor misalignments by coordinating multiple IMUs. This can include any configuration where individual IMUs are positioned on, or near, the outside of each lens, e.g., the display screens 102, as shown in FIG. 6A. This can include embedding IMUs in Liquid crystal on silicon LCoS or LCOS display panels, such as any one of the sensor positions 101A-101H shown in FIG. 1 or FIG. 6A. In one illustrative example, individual IMUs can be positioned behind, or attached to, the first sensor 101A and the third sensor 101C. Such configurations can increase or maximize the rigidity of the sensor relative to the display subsystem over varying temperatures and mechanical loads imparted on the device. For example, each IMU can be used to generate a first set of properties at $T_0$ and a second set of properties at $T_1$. When the first set of properties and the second set of properties meet one or more criteria, the system can control the display of a rendered object to compensate for misalignments caused by a deformation of the device.

Depending on the sensitivity of the IMUs and the quality of in-field calibration, e.g., at runtime, the device can average out noise and obtain a clean signal. The two IMUs enable such features without environmental concerns, as compared with the head tracking cameras which are affected by environmental features. There are also various types of deformations, e.g., a toe out, that are not observable from cameras, whereas the IMU is equally observable in all 3 rotational directions.

Each IMU can generate an output that indicates a rate measurement in degrees per second. If a device includes the same type of IMU, also referred to herein as a gyroscope or gyro, each device will generate roughly the same rate when they are subjected to the same movement patterns. If the IMUs have not changed their orientation with respect to one another, then each IMU will generate roughly the same rate output in degrees per second per side. However, there could be some differences between the IMUs. To address this issue, the device can execute a calibration method and obtain their intrinsic properties and extrinsic properties. Once the IMUs are calibrated, given that there is no deformation in the device, e.g., a pair of glasses housing the IMUs, each IMU should provide the same reading. If one IMU becomes misaligned with respect to the other, even when the device is moving with a user, the IMU that is misaligned with respect to the other one will have a different rate output. Thus, based on the amount of change in that rate output, the device can determine how much orientation error there is from one side to the other. That orientation error can be used to adjust a position of a rendered object to compensate for any deformation in the device. The adjustment can also be used to align a rendered object with a background view, such as a view of a surrounding environment, or a view of a real-world object viewed by a user through a semi-transparent screen.

With reference to FIG. 6B, an example method for a multi-IMU embodiment is shown and described below. In general, the method includes a calibration process that identifies an initial difference between the output rates of at least two IMUs. When the difference between the IMU rates exceeds a threshold, the device adjusts a rendered object to correct a misalignment caused by a deformation of the device 100.

The calibration process can include operations for receiving signals from a first IMU 101A and a second IMU 101B at a first time, e.g., at $T_0$. A first signal from the first IMU 101A can indicate a first initial rate 610A and a second signal from a second IMU 101B can indicate a second initial rate 611A. These rates may differ slightly even if the sensors are the same, e.g., the same make and model. The device can store an initial rate differential 612A that defines a difference or a ratio between the first initial rate 610A and the second initial rate 611A. As shown, the initial rate differential 612A can be a ratio between the two rates or the initial rate differential 612A can be a difference between the two rates.

At runtime, the device can measure the sensor rates to generate a second set of sensor properties. This process can include receiving additional signals during operation of the display device at a second time, e.g., at $T_1$. A first additional signal from the first IMU 101A can indicate a first runtime rate 610B and a second additional signal from the second IMU 101B can indicate a second runtime rate 611B. The device can store a runtime rate differential 612B that defines a difference or a ratio between the first runtime rate 610B and the second runtime rate 611B.

The device can then compare the initial set of properties against the runtime properties. This can include operations for determining if the initial rate differential 612A and the runtime rate differential 612B deviates more than a threshold. If the runtime rate differential 612B deviates from initial rate differential 612A more than a threshold, the device can then control the display of a rendered object 301 on a display screen 201. The control of the display of the rendered object 301 can correct a misalignment of the rendered object 301 caused by a detected deformation of the device 100. For example, at calibration, if the initial rate differential 612A show that the two sensors have a difference of 0.002 mrad/second, and then at runtime, the device detects that the two sensors have a difference of 0.01 mrad/second, using an example threshold of 0.005 mrad/second, the system may determine that the device has deformed, and the device can respond by controlling the display of a rendered object.

As described herein, control of the display of the rendered object can include, maintaining a position of the rendered object within a display screen, rotating the rendered object, or translating the rendered object. The rendered object can be maintained at a predetermined location within a display screen in a situation where a detected change in a sensor rate give a false positive reading that the device has moved, when in fact the device was deformed. By detecting a deformation when the sensor rates meet one or more criteria, a device enables more stability of a rendered holographic image.

A distance of an object translation within a display screen, e.g., how far a holographic image is moved, can be based on how much the rate differential changes. For instance, controlling the display of an object can include translating the rendered object within the display screen using a distance that is based on a change between the initial rate differential and the runtime rate differential. Also, a degree of how much the rendered object rotates is based on how much the rate differential changes. For instance, controlling a display can include rotating the rendered object within the display screen, wherein a degree of rotation of the rendered object is based on a change between the initial rate differential and the runtime rate differential.

A direction of rotation of a rendered object can be based on how the rates change with respect to one another. For example, if the first rate increases relative to the second rate disproportionally, the rendered object may rotate in a certain direction. For example, if the initial rate differential is a ratio between the first initial rate from the first sensor and the second initial rate from the second sensor, the device may rotate the rendered object in a first direction, e.g., rotate to the right, when this ratio increases between the first time $T_0$ and the second time $T_1$. Similarly, the device may rotate the rendered object in a second direction, e.g., rotate to the left, when this ratio decreases between the first time $T_0$ and the second time $T_1$.

A direction of a translation of the rendered object can be based on how the rates change with respect to one another. For example, if the first rate increases relative to the second rate disproportionally, the rendered object may translate in a certain direction, e.g., object is moved left, up, right or down. For example, if the initial rate differential is a ratio between the first initial rate from the first sensor and the second initial rate from the second sensor, the device may translate the rendered object in a first direction, e.g., move the object to the right, when this ratio increases between the first time $T_0$ and the second time $T_1$. Similarly, the device may rotate the rendered object in a second direction, e.g., move the object to the left, when this ratio decreases between the first time $T_0$ and the second time $T_1$.

Although this example illustrates an embodiment where there are only two IMUs, the present disclosure can apply to any number of IMUs. In addition, although this example illustrates an embodiment where the IMUs operate using a single modality, e.g., using inertial measurements, the techniques disclosed herein also apply to the use of the IMUs in conjunction with any of the other modalities described herein. For example, a device may include IMUs that are mechanically coupled to a display screen and tracking cameras that are also mechanically coupled to the display screen. In such embodiments, the device can utilize the estimates from the IMU and the estimates defining the depth error from the tracking cameras to jointly correct for display misalignment. In such embodiments, the device can utilize an orientation error from the IMUs indicating a deformation, e.g., how much is the device toe-in, toe-out, vertical, etc.

The device can also concurrently use the multi-IMU embodiment other modalities to generate other data, such as the triangulation measurements and scale estimates from the head tracking triangulation methods described herein. The combination of these two types of methods allows the device to determine how much the device has deformed, e.g., toed-in, toed-out, and the scale error/depth error and use those calculations to correct for display misalignment caused by device deformation. In another illustrative example, the depth error that is determined in the previously described examples can be combined with a rate differential between two gyroscopes to determine a value of a translation or rotation of a rendered object. This can include averaging or multiplying the combined readings with one or more coefficients to determine one or more values that may cause a rendered object to rotate or translate according to those values within a display screen.

Figure 7:
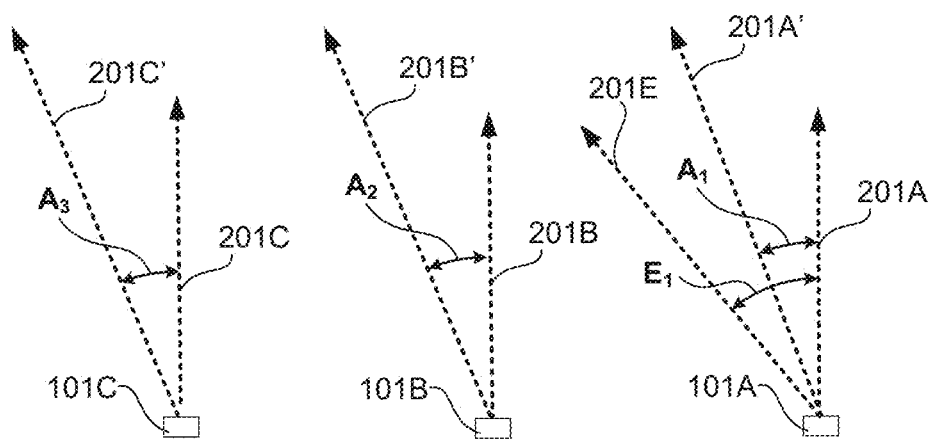
FIG. 7 is a top view of reference vectors representing one or more properties of sensors of a device in several example scenarios.

FIG. 7 shows example scenarios where properties of the sensors are determined and analyzed to control the display of a rendered object and to determine if a device has sustained deformation over time. For illustrative purposes, FIG. 7 shows a top view of reference vectors use to represent properties of sensors of a device. This example is provided for illustrative purposes and is not to be construed as limiting. It can be appreciated that the sensors can be configured to generate data defining properties of individual sensors based on the location of objects in a 3D space.

The example of FIG. 7 shows how a device can control the display of one or more rendered objects based on properties that are estimated at two or more different times, e.g., at calibration, runtime, etc. In some configurations, the device can stabilize a rendering of an image even if the device is deformed, e.g., has endured some type of structural change, by analyzing properties from multiple sensors over time. For instance, a device can determine that it has not endured some type of structural change and also determine that a real-world object has moved relative to the device if a threshold number of sensors generate signals that are consistent with one another, e.g., a predetermined set of sensors "agree," since each sensor detects a similar movement or orientation change of the device or the tracked object. The device can also determine that it has actually endured some form of structural change and determine that a real-world object has not moved relative to the device if the sensors do not "agree," e.g., the sensors do not generate signals that are consistent with one another.

In the example of FIG. 7, consider a scenario where the sensors generate a first set of properties at time $T_1$. The first set of properties can be generated when the sensors 101 have a first position and/or a first orientation, which in this example are represented by the reference vectors 201A-201C. Then, at time $T_2$, the device generates a second set of properties when the sensors 101 have a second position and/or a second orientation, which in this example are represented by the reference vectors 201A'-201C'. These changes in the position and/or orientation of the sensors may be caused by a movement of the device and/or a movement of a real-world object tracked by the sensors. If the device has not deformed between $T_1$ and $T_2$, each sensor can generate properties that each represent a consistent interpretation of a change in the position and/or orientation of the device or a real-world object. Various measurements, such as angle measurements $A_1$-$A_3$, can be used to determine one or more properties for each device. In this example, the angle measurements can have values that are consistent with a movement of the device, or a real-world object being tracked by the device. When the analyzed properties indicate such a result, the device may control the display of a rendered object and allow the rendered object to move within the display area so the device can maintain a visual alignment rendered object and the real-world object.

In another example having an alternative result, if the device has endured some form of structural change, e.g., the frame of the glasses endured some type of physical deformation between $T_1$ and $T_2$, the sensors would cause the generation of a second set of properties that are not consistent with the movement of the device or a real-world object. For example, in this alternative result, at $T_2$, the first sensor 101A can cause the generation of one or more property values, which in this example is represented by an example reference vector 201E. Also, second sensor 101B and third sensor 101C can cause the generation of one or more properties values, which in this example are represented by the reference vectors 201B' and 201C'. By comparing these property values, and other calculated properties, e.g., properties derived from an errant angle measurement $E_1$ with the other angle measurements $A_2$ and $A_3$, the device can determine that at least one sensor is not in "agreement" with the other sensors, e.g., that second set of properties that are not consistent with the movement of the device or a real-world object. When the analyzed properties indicate such a result, the device may control the display of a rendered object and not allow the rendered object to move within the display area. By restricting the movement of rendered object in this scenario, the system can reduce or eliminate unwanted movements of holographic images, particularly when device undergoes some type of deformation.

Figure 8:
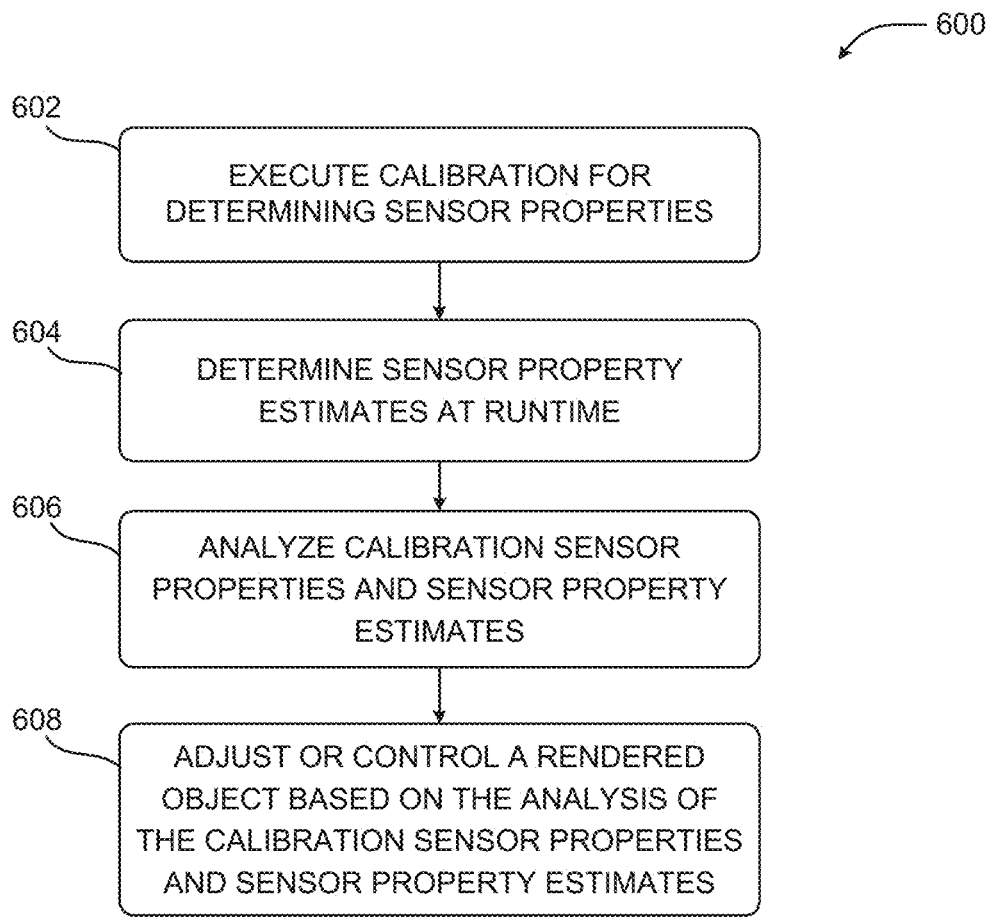
FIG. 8 is a flow diagram showing aspects of a routine for the disclosed techniques.

Turning now to FIG. 8, aspects of a routine 600 for detecting sensor misalignments in a display device by the use of sensors across multiple modalities are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 600 are described herein as being implemented, at least in part, by an application, component and/or circuit, such as a device module 915 that can be included in any one of the memory components disclosed herein, including but not limited to RAM 914. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine 600 may be also implemented in many other ways. For example, the routine 600 may be implemented, at least in part, by a processor of another remote computer or a local circuit. In addition, one or more of the operations of the routine 600 may alternatively or additionally be implemented, at least in part, by a chipset working alone or in conjunction with other software modules. Any service, circuit or application suitable for providing input data indicating the position or state of any device may be used in operations described herein.

With reference to FIG. 8, the routine 600 begins at operation 601, where the device module 915 executes one or more calibration techniques for determining sensor properties. In this example, a device receives signals from the at least three sensors 101 to generate a first set of properties 220A for each of the at least three sensors having at least two different sensing modalities. The first set of properties can include any combination of intrinsic or extrinsic properties, e.g., focal length, field-of-view, data defining a relative rotation and/or translation of a sensor, or relative rotation and/or translation of a sensor relative to other sensors. The first set of properties can also define error that is either known or measured for a particular sensor.

At operation 604, the device module 915 can determine estimates of the properties during runtime and compare those estimates with the properties determined at calibration. For example, during runtime, the device can receive additional signals during operation of the display device from the at least three sensors 101 to generate a second set of properties 220B for each of the at least three sensors that utilize at least two different sensing modalities. The second set of properties 220B can include any combination of intrinsic or extrinsic properties, e.g., focal length, field-of-view, data defining a relative rotation and/or translation of a sensor, or relative rotation and/or translation of a sensor relative to other sensors.

For illustrative purposes, a sensing modality can include a particular sensing technique. For example, a first sensing technique can involve a stereo depth measurement, a second sensing technique can involve a time-of-flight depth measurement, a third sensing technique can involve measurements of deformation using multiple IMUs, or yet another sensing technique can involve the use of IMUs with a stereo depth measurement, etc. A sensing modality can involve combinations of techniques as well. For instance, an individual sensing modality can include a stereo depth measurement in combination with a time-of-flight depth measurement. Thus, for example, a display device can be considered as a multi-sensor, multi-modality system by incorporating a first set of sensors using a stereo depth measurement and a second set of sensors generating multiple images used for image rectification.

At operation 606, the device module 915 can determine if the first set of properties 220A and the second set of properties 220B meet one or more criteria. In some configurations, first set of properties 220A and the second set of properties 220B, which are collectively referred to herein as "properties 220," can be determined to meet one or more criteria when a change in predetermined properties of the first set 220A and the predetermined properties of the second set 220B have less than a threshold level of change. In some configurations, the properties 220 can be determined to meet one or more criteria when a change in a predetermined properties of the first set 220A and the predetermined properties of the second set 220B have more than a threshold level of change. In such an example, if a predetermined property defines a distance between two or more sensors, the system may determine that an image is to be controlled if the distance between two or more sensors has increased beyond a threshold value. A rendering can be controlled to maintain a particular position in a display screen to reduce hologram jitter when the sensors move due to device deformation. The distance between devices can be calculated by having each device, each of which can use different modalities, determine a distance and/or location of a real-world object and then determine a distance between each sensor.

In another example, in the example embodiment where a first sensor uses time of flight and other sensors use triangulation to determine an error between the two types of measurement using different modalities, the system can examine the error of the first set of properties and the error of the second set of properties. If a predetermined property, e.g., a determined error between different measurements from different sensing modalities, increases beyond a threshold between the two estimates, the system may control a rendering using one or more techniques. For example, a rendering can be controlled to maintain a particular position in a display screen to reduce hologram jitter when the error exceeds a threshold. This can occur since a change in the error beyond a threshold can indicate deformation of the device. The distances measured using different sensing modalities can be calculated by having each sensor, which can use different modalities, determine a distance and/or location of a real-world object and track the differences, e.g., the error, between the two modalities. In some configurations, the properties 220 can be determined to meet one or more criteria when an error does not exceed a threshold, in such scenarios, the system may allow the device to move a rendered object according to a movement detected by one or more sensors.

In another example, the system can determine that properties 220 meet one or more criteria when a predetermined collection of sensors each indicate a translation or rotation within a threshold difference of one another. For instance, if a first sensor indicates a 10 mm translation or a 20° rotation, and a second sensor indicates a 12 mm translation or a 25° rotation at the same time, e.g., different groups of sensors using different modalities do not maintain a threshold tolerance between one another, the system may determine the presence of a deformation of the device and the device may control a rendered object such that the rendered object does not follow a detected translation or rotation. In such scenarios, the device may restrict the movement of a rendered object or translate or rotate the object according to the another set of sensors.

In some configurations, the system may determine that the device has not deformed or determined that the device had less than a threshold of deformation when each sensor, of a predetermined set of sensors, has detected consistent levels of translation or rotation. In such a case, the device may control a rendered object such that the rendered object follows a detected translation or rotation. In this scenario, the sensors having different modalities do "agree" and allow movement of the rendered object according to the predetermined set of sensors.

At operation 608, the device module 915 can control a display of a rendered object 301 in response to determining that the first set of properties 220A and the second set of properties 220B meet one or more criteria. In some configurations, the display of the rendered object 301 can be controlled to maintain an alignment between the rendered object 301 and real-world objects in a surrounding environment even if the frame 202 of the display device 100 is subjected to a deformation. Control of the display of a device can include maintaining a position or orientation of a rendered object in a display area for the purposes of mitigating hologram jitter caused by device deformation. Control of the display of a device can include allowing a change in a position or orientation of a rendered object in a display area for the purposes of mitigating hologram jitter caused by device deformation.

Turning now to FIG. 9, an illustrative computing device architecture 900 for a computing device that is capable of executing various software components described herein. The computing device architecture 900 is applicable to computing devices that facilitate mobile computing due, in part, to form factor, wireless connectivity, and/or battery-powered operation. The computing device architecture 900 can be the architecture of the display device 100 of FIG. 1. In some configurations, the computing devices include, but are not limited to, a near-to-eye display device, e.g., glasses or a head mounted display unit. The computing device architecture 900 can also apply to any other device that may use or implement parts of the present disclosure, including, but not limited to, mobile telephones, tablet devices, slate devices, portable video game devices, and the like. Moreover, aspects of the computing device architecture 900 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 900 illustrated in FIG. 9 includes a processor 902, memory components 904, network connectivity components 906, sensor components 908, input/output components 912, and power components 912. In the illustrated configuration, the processor 902 is in communication with the memory components 904, the network connectivity components 906, the sensor components 908, the input/output ("I/O") components 910, and the power components 912. Although no connections are shown between the individuals components illustrated in FIG. 9, the components can interact to carry out device functions. In some configurations, the components are arranged so as to communicate via one or more busses (represented by one or more lines between the components).

The memory components 904 is connected to the CPU 902 through a mass storage controller (not shown) and a bus. The memory components 904 and its associated computer-readable media provide non-volatile storage for the computer architecture 900. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, the computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 900. For purposes the claims, the phrase "computer storage medium," "computer-readable storage medium," "non-transitory computer storage media" and variations thereof, does not include waves, signals, and/or other transitory and/or intangible communication media, per se.

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, a touch-enabled input.

In some configurations, the processor 902 includes a graphics processing unit ("GPU") configured to accelerate operations performed by the CPU, including, but not limited to, operations performed by executing general-purpose scientific and/or engineering computing applications, as well as graphics-intensive computing applications such as high-resolution video (e.g., 720P, 1030P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein the sequential part of an application executes on the CPU and the computationally intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include random access memory ("RAM") 914, read-only memory ("ROM") 916, an integrated storage memory ("integrated storage") 918, or a removable storage memory ("removable storage") 920. In some configurations, the RAM 914 or a portion thereof, the ROM 916 or a portion thereof, and/or some combination the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920. The RAM or any other component can also store the device module 915 or other software modules for causing execution of the operations described herein.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The magnetometer 928 is configured to measure the strength and direction of a magnetic field. In some configurations the magnetometer 928 provides measurements to a compass application program stored within one of the memory components 904 in order to provide a user with accurate directions in a frame of reference including the cardinal directions, north, south, east, and west. Similar measurements may be provided to a navigation application program that includes a compass component. Other uses of measurements obtained by the magnetometer 928 are contemplated.

The ambient light sensor 930 is configured to measure ambient light. In some configurations, the ambient light sensor 930 provides measurements to an application program stored within one of the memory components 904 in order to automatically adjust the brightness of a display (described below) to compensate for low-light and high-light environments. Other uses of measurements obtained by the ambient light sensor 930 are contemplated.

The proximity sensor 932 is configured to detect the presence of an object in proximity to the computing device without direct contact. In some configurations, the proximity sensor 932 detects the presence of a user's body (e.g., the user's face) and provides this information to an application program stored within one of the memory components 904 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 932 are contemplated.

The accelerometer 934 is configured to measure proper acceleration. In some configurations, output from the accelerometer 934 is used by an application program as an input mechanism to control some functionality of the application program. For example, the application program may be a video game in which a character, a portion thereof, or an object is moved or otherwise manipulated in response to input received via the accelerometer 934. In some configurations, output from the accelerometer 934 is provided to an application program for use in switching between landscape and portrait modes, calculating coordinate acceleration, or detecting a fall. Other uses of the accelerometer 934 are contemplated.

The gyroscope 936 is configured to measure and maintain orientation. In some configurations, output from the gyroscope 936 is used by an application program as an input mechanism to control some functionality of the application program. For example, the gyroscope 936 can be used for accurate recognition of movement within a 3D environment of a video game application or some other application. In some configurations, an application program utilizes output from the gyroscope 936 and the accelerometer 934 to enhance control of some functionality of the application program. Other uses of the gyroscope 936 are contemplated.

The GPS sensor 938 is configured to receive signals from GPS satellites for use in calculating a location. The location calculated by the GPS sensor 938 may be used by any application program that requires or benefits from location information. For example, the location calculated by the GPS sensor 938 may be used with a navigation application program to provide directions from the location to a destination or directions from the destination to the location. Moreover, the GPS sensor 938 may be used to provide location information to an external location-based service, such as E911 service. The GPS sensor 938 may obtain location information generated via WI-FI, WIMAX, and/or cellular triangulation techniques utilizing one or more of the network connectivity components 906 to aid the GPS sensor 938 in obtaining a location fix. The GPS sensor 938 may also be used in Assisted GPS ("A-GPS") systems.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interface described below, or may include processing functionality built-in to the processor 902.

The display 940 is an output device configured to present information in a visual form. In particular, the display 940 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 940 is a liquid crystal display ("LCD") utilizing any active or passive matrix technology and any backlighting technology (if used). In some configurations, the display 940 is an organic light emitting diode ("OLED") display. Other display types are contemplated.

The touchscreen 942, also referred to herein as a "touch-enabled screen," is an input device configured to detect the presence and location of a touch. The touchscreen 942 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 942 is incorporated on top of the display 940 as a transparent layer to enable a user to use one or more touches to interact with objects or other information presented on the display 940. In other configurations, the touchscreen 942 is a touch pad incorporated on a surface of the computing device that does not include the display 940. For example, the computing device may have a touchscreen incorporated on top of the display 940 and a touch pad on a surface opposite the display 940.

In some configurations, the touchscreen 942 is a single-touch touchscreen. In other configurations, the touchscreen 942 is a multi-touch touchscreen. In some configurations, the touchscreen 942 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 942. As such, a developer may create gestures that are specific to a particular application program.

In some configurations, the touchscreen 942 supports a tap gesture in which a user taps the touchscreen 942 once on an item presented on the display 940. The tap gesture may be used for various reasons including, but not limited to, opening or launching whatever the user taps. In some configurations, the touchscreen 942 supports a double tap gesture in which a user taps the touchscreen 942 twice on an item presented on the display 940. The double tap gesture may be used for various reasons including, but not limited to, zooming in or zooming out in stages. In some configurations, the touchscreen 942 supports a tap and hold gesture in which a user taps the touchscreen 942 and maintains contact for at least a pre-defined time. The tap and hold gesture may be used for various reasons including, but not limited to, opening a context-specific menu.

In some configurations, the touchscreen 942 supports a pan gesture in which a user places a finger on the touchscreen 942 and maintains contact with the touchscreen 942 while moving the finger on the touchscreen 942. The pan gesture may be used for various reasons including, but not limited to, moving through screens, images, or menus at a controlled rate. Multiple finger pan gestures are also contemplated. In some configurations, the touchscreen 942 supports a flick gesture in which a user swipes a finger in the direction the user wants the screen to move. The flick gesture may be used for various reasons including, but not limited to, scrolling horizontally or vertically through menus or pages. In some configurations, the touchscreen 942 supports a pinch and stretch gesture in which a user makes a pinching motion with two fingers (e.g., thumb and forefinger) on the touchscreen 942 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 942. As such, the above gestures should be understood as being illustrative and should not be construed as being limiting in any way.

The data I/O interface component 944 is configured to facilitate input of data to the computing device and output of data from the computing device. In some configurations, the data I/O interface component 944 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 946 is configured to provide audio input and/or output capabilities to the computing device. In some configurations, the audio I/O interface component 946 includes a microphone configured to collect audio signals. In some configurations, the audio I/O interface component 946 includes a headphone jack configured to provide connectivity for headphones or other external speakers. In some configurations, the audio I/O interface component 946 includes a speaker for the output of audio signals. In some configurations, the audio I/O interface component 946 includes an optical audio cable out.

The video I/O interface component 948 is configured to provide video input and/or output capabilities to the computing device. In some configurations, the video I/O interface component 948 includes a video connector configured to receive video as input from another device (e.g., a video media player such as a DVD or BLURAY player) or send video as output to another device (e.g., a monitor, a television, or some other external display). In some configurations, the video I/O interface component 948 includes a High-Definition Multimedia Interface ("HDMI"), mini-HDMI, micro-HDMI, DisplayPort, or proprietary connector to input/output video content. In some configurations, the video I/O interface component 948 or portions thereof is combined with the audio I/O interface component 946 or portions thereof.

The camera 950 can be configured to capture still images and/or video. The camera 950 may utilize a charge coupled device ("CCD") or a complementary metal oxide semiconductor ("CMOS") image sensor to capture images. In some configurations, the camera 950 includes a flash to aid in taking pictures in low-light environments. Settings for the camera 950 may be implemented as hardware or software buttons. The camera can also include any type of sensor using any type of modality, e.g., a first modality may be under infrared, a second modality may be under a different spectrum, e.g., visible light, laser, etc. The camera may also include a time-of-flight sensor which can operate using any suitable medium, e.g., sonar, radar, etc. the camera can also be in the form of a lidar sensor for capturing images and distances device and will object in a surrounding environment.

Although not illustrated, one or more hardware buttons may also be included in the computing device architecture 900. The hardware buttons may be used for controlling some operational aspect of the computing device. The hardware buttons may be dedicated buttons or multi-use buttons. The hardware buttons may be mechanical or sensor-based.

The illustrated power components 914 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The battery gauge 954 can be configured to measure battery parameters such as current, voltage, and temperature. In some configurations, the battery gauge 954 is configured to measure the effect of a battery's discharge rate, temperature, age and other factors to predict remaining life within a certain percentage of error. In some configurations, the battery gauge 954 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 912 may also include a power connector, which may be combined with one or more of the aforementioned I/O components 910. The power components 912 may interface with an external power system or charging equipment via an I/O component.

The present disclosure is supplemented by the following example clauses.

Clause A. A display device (100) comprising: at least three sensors (101) affixed to a frame (202) of the display device (100), wherein individual sensors of the at least three sensors (101) having at least two different sensing modalities; one or more processors (902); and a computer-readable storage medium (904) having encoded thereon computer-executable instructions to cause the one or more processing units (902) to: receive signals from the at least three sensors (101) to generate a first set of properties (220A) for each of the at least three sensors having at least two different sensing modalities; receive additional signals during operation of the display device from the at least three sensors (101) to generate a second set of properties (220B) for each of the at least three sensors having at least two different sensing modalities; determine that the first set of properties (220A) and the second set of properties (220B) meet one or more criteria; and control a display of a rendered object (301) on a display screen in response to determining that the first set of properties (220A) and the second set of properties (220B) meet one or more criteria, wherein the control of the display of the rendered object (301) maintains an alignment between the rendered object (301) and at least one real-world object while the frame (202) of the display device (100) subjected to a deformation.

Clause B: The display device, device, or method of any of the example clauses, wherein at least two sensors of a first sensing modality are configured to use a triangulation method for determining a first distance measurement of the real-world object, wherein at least one sensor of a second sensing modality is configured to use a time-of-flight method for determining a second distance measurement of a real-world object, wherein the first distance measurement and the second distance measurement are determined at a first time to generate the first set of properties, wherein the first distance measurement and the second distance measurement are determined at a second time to generate the second set of properties.

Clause C: The display device, device, or method of any of the example clauses, wherein the first set of properties and the second set of properties meet one or more criteria when the first distance measurement and the second distance measurement determined at the first time and the first distance measurement, and the second distance measurement determined at the second time indicate a deformation of the display device.

Clause D: The display device, device, or method of any of the example clauses, wherein the first set of properties and the second set of properties meet one or more criteria when the first distance measurement and the second distance measurement determined at the first time and the first distance measurement and the second distance measurement determined at the second time indicate a deformation of the display device.

Clause E: The display device, device, or method of any of the example clauses, wherein control a display of the rendered object maintains the alignment between the rendered object and the at least one real-world object by maintaining a position of the rendered object at a position in a display screen.

Clause F: The display device, device, or method of any of the example clauses, wherein control a display of the rendered object maintains the alignment between the rendered object and the at least one real-world object by allowing movement or rotation of the rendered object when the first set of properties and the second set of properties indicate less than a threshold level of deformation.

Clause G: The display device, device, or method of any of the example clauses, wherein the first set of properties includes a first error level for a first rotation measurement of the display device, and the second set of properties includes a second error level for second first rotation measurement of the display device, wherein the first set of properties and the second set of properties meet one or more criteria when the first error level is outside of a threshold of the second error level.

Clause H: A method for execution on a display device (100), comprising: receiving input signals from at least three sensors (101) to generate a first set of properties (220A) for each of the at least three sensors having at least two different sensing modalities; receiving additional signals during operation of the display device from the at least three sensors (101) to generate a second set of properties (220B) for each of the at least three sensors having at least two different sensing modalities; determining that the first set of properties (220A) and the second set of properties (220B) meet one or more criteria; and controlling a display of a rendered object (301) on a display screen (201) in response to determining that the first set of properties (220A) and the second set of properties (220B) meet one or more criteria, wherein the control of the display of the rendered object (301) compensates for visual anomalies caused by a deformation of the frame (202) of the display device (100).

Clause I: The display device, device, or method of any of the example clauses, wherein at least two sensors of a first sensor modality are configured to use a triangulation method for determining a first distance measurement of the real-world object, wherein at least one sensor of a second sensor modality is configured to use a time-of-flight method for determining a second distance measurement of a real-world object, wherein the first distance measurement and the second distance measurement are determined at a first time to generate the first set of properties, wherein the first distance measurement and the second distance measurement are determined at a second time to generate the second set of properties.

Clause J: The display device, device, or method of any of the example clauses, wherein the first set of properties and the second set of properties meet one or more criteria when the first distance measurement and the second distance measurement determined at the first time and the first distance measurement, and the second distance measurement determined at the second time indicate a deformation of the display device.

Clause K: The display device, device, or method of any of the example clauses, wherein the at least three sensors include imaging sensors, wherein a first imaging sensor is positioned between a second imaging sensor and a third imaging sensor, wherein the second imaging sensor and the third imaging sensor utilize triangulation to determine a first distance measurement to the real-world object, wherein the first set of properties and the second set of properties meet one or more criteria when images from the at least three sensors indicate a rectification error, wherein controlling the display of the rendered object includes displaying the rendered object at a position that is based on a depth error caused by a deformation of the display device.

Clause L: The display device, device, or method of any of the example clauses, wherein a direction of a translation of the rendered object within a display screen is based on a direction indicated by a detected pixel with respect to an expected pixel.

Clause M: The display device, device, or method of any of the example clauses, wherein control a display of the rendered object maintains the alignment between the rendered object and the at least one real-world object by allowing movement or rotation of the rendered object when the first set of properties and the second set of properties indicate less than a threshold level of deformation.

Clause N: The display device, device, or method of any of the example clauses, wherein the first set of properties includes a first error level for a first rotation measurement of the display device, and the second set of properties includes a second error level for second first rotation measurement of the display device, wherein the first set of properties and the second set of properties meet one or more criteria when the first error level is outside of a threshold of the second error level.

Clause O: A method for correcting a misalignment of a rendered object (301) caused by a deformation of a device (100), the method configured for execution on the device (100), comprising: receive signals from a first IMU (101A) and a second IMU (101B) at a first time, wherein a first signal from the first IMU (101A) indicates a first initial rate (610A), and a second signal from a second IMU (101B) indicates a second initial rate (611A), wherein an initial rate differential (612A) defines a difference between the first initial rate (610A) and the second initial rate (611A); receiving additional signals during operation of the display device at a second time, wherein a first additional signal from the first IMU (101A) indicates a first runtime rate (610B), and a second additional signal from the second IMU (101B) indicates a second runtime rate (611B), wherein a runtime rate differential (612B) defines a difference between the first runtime rate (610B) and the second runtime rate (611B); determining that the initial rate differential (612A) and the runtime rate differential (612B) deviates more than a threshold; and controlling a display of a rendered object (301) on a display screen (201) in response to determining that the initial rate differential (612A) and the runtime rate differential (612B) deviates more than the threshold, wherein the control of the display of the rendered object (301) corrects a misalignment of the rendered object (301) caused by a deformation of the device (100).

Clause P: The display device, device, or method of any of the example clauses, wherein the control of the display rotates the rendered object within the display screen, wherein a degree of rotation of the rendered object is based on a change between the initial rate differential and the runtime rate differential.

Clause Q: The display device, device, or method of any of the example clauses, wherein the control of the display translates the rendered object within the display screen, wherein a distance of a translation of the rendered object is based on a change between the initial rate differential and the runtime rate differential.

Clause R: The display device, device, or method of any of the example clauses, wherein the initial rate differential is a ratio between the first initial rate and the second initial rate, wherein the control of the display rotates the rendered object within the display screen, wherein a direction of the rotation is based on the ratio increasing or decreasing between the first time ($T_0$) and the second time ($T_1$).

Clause S: The display device, device, or method of any of the example clauses, wherein the initial rate differential is a ratio between the first initial rate and the second initial rate, wherein the control of the display translates the rendered object within the display screen, wherein a direction of the translation is based on the ratio increasing or decreasing between the first time ($T_0$) and the second time ($T_1$).

Clause T The display device, device, or method of any of the example clauses, wherein the display screen is a semi-transparent display screen configured to provide a user with a view of the at least one real-world object through the display screen, wherein the control of the display of the rendered object maintains an alignment between the rendered object (301) and at least one real-world object.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A display device comprising:
   at least three sensors affixed to a frame of the display device, wherein individual sensors of the at least three sensors having at least two different sensing modalities;
   one or more processors; and
   a non-transitory computer-readable storage medium having encoded thereon computer-executable instructions to cause the one or more processors to:
   receive signals from the at least three sensors to generate a first set of properties for each of the at least three sensors having at least two different sensing modalities;
   receive additional signals during operation of the display device from the at least three sensors to generate a second set of properties for each of the at least three sensors having at least two different sensing modalities;
   determine that the first set of properties and the second set of properties meet one or more criteria; and
   control a display of a rendered object on a display screen in response to determining that the first set of properties and the second set of properties meet one or more criteria, wherein the control of the display of the rendered object maintains an alignment between the rendered object and at least one real-world object while the frame of the display device subjected to a deformation.

2. The display device of claim 1, wherein at least two sensors of a first sensing modality are configured to use a triangulation method for determining a first distance measurement of the real-world object, wherein at least one sensor of a second sensing modality is configured to use a time-of-flight method for determining a second distance measurement of a real-world object, wherein the first distance measurement and the second distance measurement are determined at a first time to generate the first set of properties, wherein the first distance measurement and the second distance measurement are determined at a second time to generate the second set of properties.

3. The display device of claim 2, wherein the first set of properties and the second set of properties meet one or more criteria when the first distance measurement and the second distance measurement determined at the first time and the first distance measurement, and the second distance measurement determined at the second time indicate a deformation of the display device.

4. The display device of claim 1, wherein the first set of properties and the second set of properties meet one or more criteria when the first distance measurement and the second distance measurement determined at the first time and the first distance measurement and the second distance measurement determined at the second time indicate a deformation of the display device.

5. The display device of claim 1, wherein control a display of the rendered object maintains the alignment between the rendered object and the at least one real-world object by maintaining a position of the rendered object at a position in a display screen.

6. The display device of claim 1, wherein control a display of the rendered object maintains the alignment between the rendered object and the at least one real-world object by allowing movement or rotation of the rendered object when the first set of properties and the second set of properties indicate less than a threshold level of deformation.

7. The display device of claim 1, wherein the first set of properties includes a first error level for a first rotation measurement of the display device, and the second set of properties includes a second error level for second first rotation measurement of the display device, wherein the first set of properties and the second set of properties meet one or more criteria when the first error level is outside of a threshold of the second error level.

8. A method for execution on a display device, comprising:
receiving input signals from at least three sensors to generate a first set of properties for each of the at least three sensors having at least two different sensing modalities;
receiving additional signals during operation of the display device from the at least three sensors to generate a second set of properties for each of the at least three sensors having at least two different sensing modalities;
determining that the first set of properties and the second set of properties meet one or more criteria; and
controlling a display of a rendered object on a display screen in response to determining that the first set of properties and the second set of properties meet one or more criteria, wherein the control of the display of the rendered object compensates for visual anomalies caused by a deformation of the frame of the display device.

9. The method of claim 8, wherein at least two sensors of a first sensor modality are configured to use a triangulation method for determining a first distance measurement of the real-world object, wherein at least one sensor of a second sensor modality is configured to use a time-of-flight method for determining a second distance measurement of a real-world object, wherein the first distance measurement and the second distance measurement are determined at a first time to generate the first set of properties, wherein the first distance measurement and the second distance measurement are determined at a second time to generate the second set of properties.

10. The method of claim 9, wherein the first set of properties and the second set of properties meet one or more criteria when the first distance measurement and the second distance measurement determined at the first time and the first distance measurement, and the second distance measurement determined at the second time indicate a deformation of the display device.

11. The method of claim 8, wherein the at least three sensors include imaging sensors, wherein a first imaging sensor is positioned between a second imaging sensor and a third imaging sensor, wherein the second imaging sensor and the third imaging sensor utilize triangulation to determine a first distance measurement to the real-world object, wherein the first set of properties and the second set of properties meet one or more criteria when images from the at least three sensors indicate a rectification error, wherein controlling the display of the rendered object includes displaying the rendered object at a position that is based on a depth error caused by a deformation of the display device.

12. The method of claim 11, wherein a direction of a translation of the rendered object within a display screen is based on a direction indicated by a detected pixel with respect to an expected pixel.

13. The method of claim 8, wherein control a display of the rendered object maintains the alignment between the rendered object and the at least one real-world object by allowing movement or rotation of the rendered object when the first set of properties and the second set of properties indicate less than a threshold level of deformation.

14. The method of claim 8, wherein the first set of properties includes a first error level for a first rotation measurement of the display device, and the second set of properties includes a second error level for second first rotation measurement of the display device, wherein the first set of properties and the second set of properties meet one or more criteria when the first error level is outside of a threshold of the second error level.

15. A method for correcting a misalignment of a rendered object caused by a deformation of a device, the method configured for execution on the device, comprising:
receive signals from a first inertial measurement unit and a second inertial measurement unit at a first time, wherein a first signal from the first inertial measurement unit indicates a first initial rate, and a second signal from a second inertial measurement unit indicates a second initial rate, wherein an initial rate differential defines a difference between the first initial rate and the second initial rate;
receiving additional signals during operation of the display device at a second time, wherein a first additional signal from the first inertial measurement unit indicates a first runtime rate, and a second additional signal from the second inertial measurement unit indicates a second runtime rate, wherein a runtime rate differential defines a difference between the first runtime rate and the second runtime rate;

determining that the initial rate differential and the runtime rate differential deviates more than a threshold; and controlling a display of a rendered object on a display screen in response to determining that the initial rate differential and the runtime rate differential deviates more than the threshold, wherein the control of the display of the rendered object corrects a misalignment of the rendered object caused by a deformation of the device.

16. The method of claim 15, wherein the control of the display rotates the rendered object within the display screen, wherein a degree of rotation of the rendered object is based on a change between the initial rate differential and the runtime rate differential.

17. The method of claim 15, wherein the control of the display translates the rendered object within the display screen, wherein a distance of a translation of the rendered object is based on a change between the initial rate differential and the runtime rate differential.

18. The method of claim 15, wherein the initial rate differential is a ratio between the first initial rate and the second initial rate, wherein the control of the display rotates the rendered object within the display screen, wherein a direction of the rotation is based on the ratio increasing or decreasing between the first time and the second time.

19. The method of claim 15, wherein the initial rate differential is a ratio between the first initial rate and the second initial rate, wherein the control of the display translates the rendered object within the display screen, wherein a direction of the translation is based on the ratio increasing or decreasing between the first time and the second time.

20. The method of claim 15, wherein the display screen is a semi-transparent display screen configured to provide a user with a view of the at least one real-world object through the display screen, wherein the control of the display of the rendered object maintains an alignment between the rendered object and at least one real-world object.

* * * * *